US007836018B2

(12) United States Patent
Oliveira et al.

(10) Patent No.: US 7,836,018 B2
(45) Date of Patent: Nov. 16, 2010

(54) SIMULTANEOUSLY ACCESSING FILE OBJECTS THROUGH WEB SERVICES AND FILE SERVICES

(75) Inventors: Fernando Oliveira, Sudbury, MA (US);
Stephen Fridella, Watertown, MA (US);
Rossen Dimitrov, Nashua, NH (US);
Patrick Eaton, Arlington, MA (US);
Raymond Angelone, Norfolk, MA (US)

(73) Assignee: EMC Corporation, Hopkinton, MA (US)

( * ) Notice: Subject to any disclaimer, the term of this patent is extended or adjusted under 35 U.S.C. 154(b) by 411 days.

(21) Appl. No.: 11/977,446

(22) Filed: Oct. 24, 2007

(65) Prior Publication Data

US 2009/0112879 A1 Apr. 30, 2009

(51) Int. Cl.
*G06F 17/00* (2006.01)
(52) U.S. Cl. .................. 707/634; 707/636; 707/659; 709/203; 709/224; 709/226; 711/6; 711/112
(58) Field of Classification Search ................. 707/634, 707/636, 659; 709/203, 206, 217, 224, 226; 711/6, 203, 112

See application file for complete search history.

(56) References Cited

U.S. PATENT DOCUMENTS

| | | | | |
|---|---|---|---|---|
| 5,313,647 | A * | 5/1994 | Kaufman et al. ............ | 717/203 |
| 6,889,309 | B1 * | 5/2005 | Oliveira et al. ......... | 707/E17.01 |
| 2003/0055878 | A1 * | 3/2003 | Fletcher et al. ............. | 709/203 |
| 2005/0114784 | A1 * | 5/2005 | Spring et al. ................ | 715/762 |
| 2005/0120025 | A1 * | 6/2005 | Rodriguez et al. ............ | 707/10 |
| 2006/0143350 | A1 * | 6/2006 | Miloushev et al. .......... | 710/242 |
| 2007/0233871 | A1 * | 10/2007 | Fletcher et al. ............. | 709/226 |
| 2007/0233880 | A1 * | 10/2007 | Nieh et al. ................... | 709/227 |
| 2007/0244987 | A1 * | 10/2007 | Pedersen et al. ............ | 709/217 |
| 2008/0189679 | A1 * | 8/2008 | Rodriguez et al. .......... | 717/105 |
| 2008/0298591 | A1 * | 12/2008 | Bradley et al. ............. | 380/277 |
| 2009/0216883 | A1 * | 8/2009 | Fellenstein et al. .......... | 709/224 |

OTHER PUBLICATIONS

Ricardo Galli—"Journal file systems in Linux"—Upgrade, vol. 11, No. 6, Dec. 2001 (pp. 1-8).*

(Continued)

*Primary Examiner*—John E Breene
*Assistant Examiner*—Anh Ly
(74) *Attorney, Agent, or Firm*—Muirhead and Saturnelli, LLC

(57) ABSTRACT

Accessing data file objects includes providing a file system interface on a client, where the file system interface allows an application running on the client to make file system calls to access the data file objects. A Web Services interface may also be provided on the client, where the Web Services interface allows an application to access file objects using the Web Services at the same time that file objects are being accessed through the file system interface. The Web Services interface may be a SOAP interface and/or a REST interface. Accessing data file objects may also include providing a direct file object interface on the client, where the direct file object interface allows an application to directly access file objects at the same time that file objects are being accessed using the Web Services interface and using the file system interface.

11 Claims, 22 Drawing Sheets

OTHER PUBLICATIONS

Yu et al.—"High performance Support of Parallel Virtual File System (PVFS2) over Quadrics"—Proceddings of the 19$^{th}$ annual international conference on Supercomputing, session 9, Operating system ACM 2005 (pp. 323-331).*

Ganeshan, B. et al., "VMWARE ESX Server 1.X and 2.X using EMC Symmetrix Storage Systems," Version 1.1, c. 2006 [retrieved Nov. 29, 2008], http://emc.com/collateral/hardware/specification-sheet/300-003-507.pdf.

*Amazon Simple Storage Service: Developer Guide*, API Version Mar. 1, 2006, Amazon Web Services LLC 2008, 153 Pages.

* cited by examiner

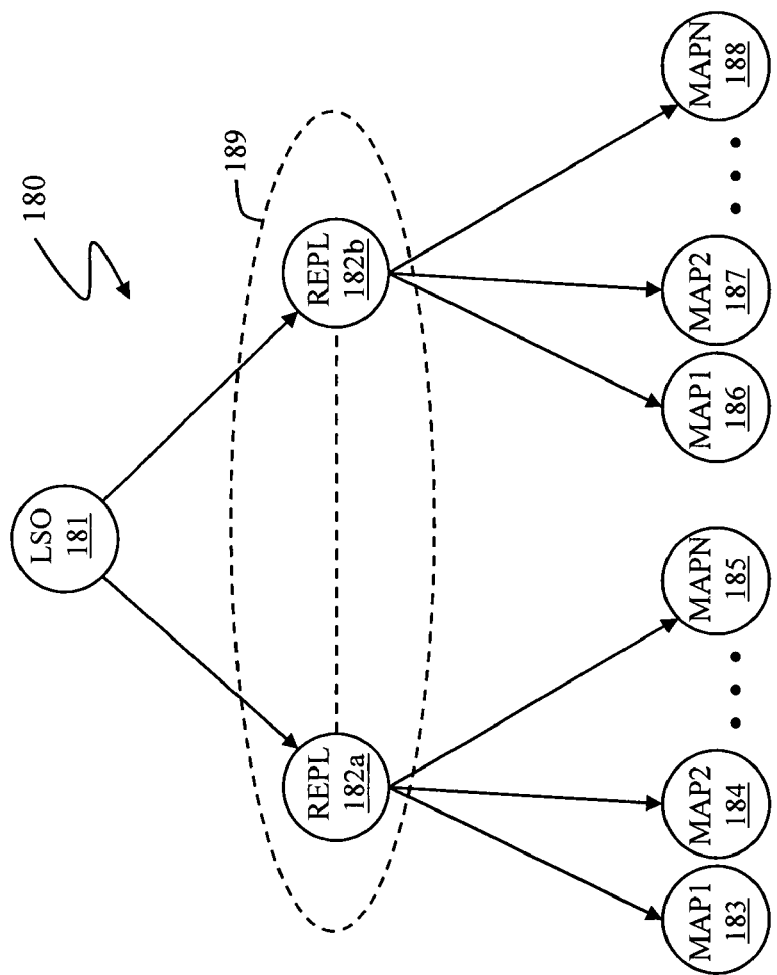
FIGURE 8
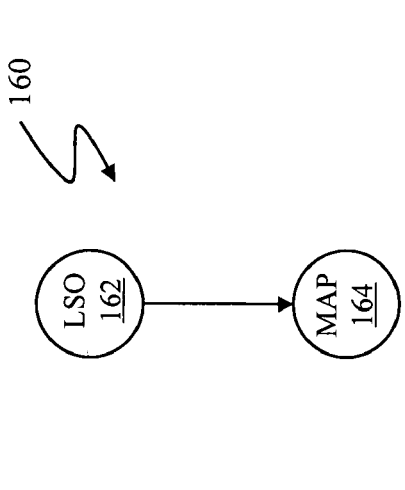
FIGURE 6
FIGURE 7

SIMULTANEOUSLY ACCESSING FILE OBJECTS THROUGH WEB SERVICES AND FILE SERVICES

BACKGROUND OF THE INVENTION

1. Technical Field

This application relates to the field of storing data, and more particularly to the field of data storage services in a scalable high capacity system.

2. Description of Related Art

It has been estimated that the amount of digital information created, captured, and replicated in 2006 was 161 exabytes or 161 billion gigabytes, which is about three million times the information in all the books ever written. It is predicted that between 2006 and 2010, the information added annually to the digital universe will increase more than six fold from 161 exabytes to 988 exabytes. The type of information responsible for this massive growth is rich digital media and unstructured business content. There is also an ongoing conversion from analog to digital formats—film to digital image capture, analog to digital voice, and analog to digital TV.

The rich digital media and unstructured business content have unique characteristics and storage requirements that are different than structured data types (e.g. database records), for which many of today's storage systems were specially designed. Many conventional storage systems are highly optimized to deliver high performance I/O for small chunks of data. Furthermore, these systems were designed to support gigabyte and terabyte sized information stores.

In contrast, rich digital media and unstructured business content have greater capacity requirements (petabyte versus gigabyte/terabyte sized systems), less predictable growth and access patterns, large file sizes, billions and billions of objects, high throughput requirements, single writer, multiple reader access patterns, and a need for multi-platform accessibility. Conventional storage systems have met these needs in part by using specialized hardware platforms to achieve required levels of performance and reliability. Unfortunately, the use of specialized hardware results in higher customer prices and may not support volume economics as the capacity demands grow large—a differentiating characteristic of rich digital media and unstructured business content.

Some of the cost issues have been addressed with tiered storage, which attempts to reduce the capital and operational costs associated with keeping all information on a single high-cost storage tier. However, tiered storage comes with a complex set of decisions surrounding technology, data durability, functionality and even storage vendor. Tiered storage solutions may introduce unrelated platforms, technologies, and software titles having non-zero operational costs and management requirements that become strained as the quantity of data increases.

In addition, tiered storage may cause a data replica incoherence which results in multiple, disjoint copies of information existing across the tiers of storage. For example, storage management software handling data backup and recovery may make multiple copies of information sets on each storage tier (e.g. snapshots, backup sets, etc). Information Life-cycle Management (ILM) software dealing with information migration from one tier to another may create additional and often overlapping copies of the data. Replication software may make an extra copy of the information set within a particular tier in order to increase performance to accessing applications. Each of these functions typically runs autonomously from one another. The software may be unable to realize and/or take advantage of the multiple replicas of the same information set.

In addition, for large scale unstructured information stores, it may be difficult to maintain a system and manage the environment as components fail. For example, a two petabyte information store may be comprised of eight thousand 250-gigabyte disk drives. Disk failures should be handled in a different manner in a system of this scale so that the system continues to operate relatively smoothly whenever one or only a few of the disk drives fail.

Thus, it would be desirable to provide a storage system that addresses difficulties associated with high-cost specialized hardware, storage tiering, and failure management.

SUMMARY OF THE INVENTION

According to the system described herein, accessing data file objects includes providing a file system interface on at least one client, where the file system interface allows an application running on the at least one client to make file system calls to access the data file objects and providing a Web Services interface on the at least one client, where the Web interface allows an application to access file objects using the Web at the same time that file objects are being accessed through the file system interface. The Web Services interface may be a SOAP interface and/or a REST interface. Accessing data file objects may also include providing a direct file object interface on the at least one client, where the direct file object interface allows an application to directly access file objects at the same time that file objects are being accessed using the Web Services interface and using the file system interface. Accessing data file objects may also include providing file name services that translate file names into file object identifiers, where the file name services are accessed by the file system interface and/or the Web Services interface. Providing the file system interface may include providing a virtual file system in a kernel address space of the at least one client. Accessing data file objects may also include providing a layout manager that manages file objects. The layout manager may be provided in the kernel address space of the at least one client. The layout manager is provided in user address space of the at least one client. The virtual file system may access the layout manager using a bridge between kernel memory address space and user memory address space.

According further to the system described herein, a client that accesses a plurality of file objects includes a file system interface that allows an application running on the at least one client to make file system calls to access the data file objects, a Web Services interface that allows an application to access file objects using the Web at the same time that file objects are being accessed through the file system interface, and a communication interface, coupled to the file system interface and to the Web Services interface, that exchanges file object data between the client and a plurality of servers containing the file objects. The client may also include a direct file object interface that allows an application to directly access file objects at the same time that file objects are being accessed using the Web Services interface and using the file system interface. The client may also include a file name service that translates file names into file object identifiers, where the file name service is accessed by the file system interface and/or the Web Services interface. The file system interface may include a virtual file system in a kernel address space of the at least one client. The client may also include a layout manager that manages file objects. The layout manager may be provided in the kernel address space of the at least one client. The layout manager may be provided in user address space of the at least one client. The virtual file system may access the layout manager using a bridge between kernel memory address space and user memory address space.

According further to the system described herein, computer software, provided in a computer-readable storage medium, includes executable code that allows an application running on at least one client to make file system calls to access the data file objects and includes executable code that allows an application to access file objects using the Web at the same time that file objects are being accessed through the file system interface. The computer software may also include executable code that allows an application to directly access file objects at the same time that file objects are being accessed using the Web and using file system calls. The computer software may also include executable code that translates file names into file object identifiers.

According further to the present invention, a system simultaneously allows accessing a plurality of file objects using a file system interface and a Web Services interface. The system includes a plurality of servers that contain the file objects and at least one client, coupled to the servers. The client includes a file system interface that allows an application running on the at least one client to make file system calls to access the data file objects, a Web Services interface that allows an application to access file objects using the Web at the same time that file objects are being accessed through the file system interface, and a communication interface, coupled to the file system interface and the Web Services interface, that exchanges file object data between the client and a plurality of servers containing the file objects. The file system interface may include a virtual file system in a kernel address space of the client.

According further to the system described herein, managing objects for a data file includes obtaining a metadata object for the file, determining if the metadata object indicates that a portion of the data file includes synchronous mirrors, and, in response to a write of new data to the data file, writing the new data to each synchronous mirror. Data objects of a data file may be in one of four states: current, stale, empty, and immutable. In response to a read operation and the corresponding data object being in a stale state, data may be read for a corresponding synchronous mirror that is in a current state.

BRIEF DESCRIPTION OF DRAWINGS

FIG. 6 is a diagram illustrating an example of a layout storage object tree for a file according to an embodiment of the system described herein.

FIG. 7 is a diagram illustrating an example of a layout storage object tree with multiple maps for a file according to an embodiment of the system described herein.

FIG. 8 is a diagram illustrating another example of a layout storage object tree with multiple maps and replication nodes for a file according to an embodiment of the system described herein.

DETAILED DESCRIPTION OF VARIOUS EMBODIMENTS

Figure 1:
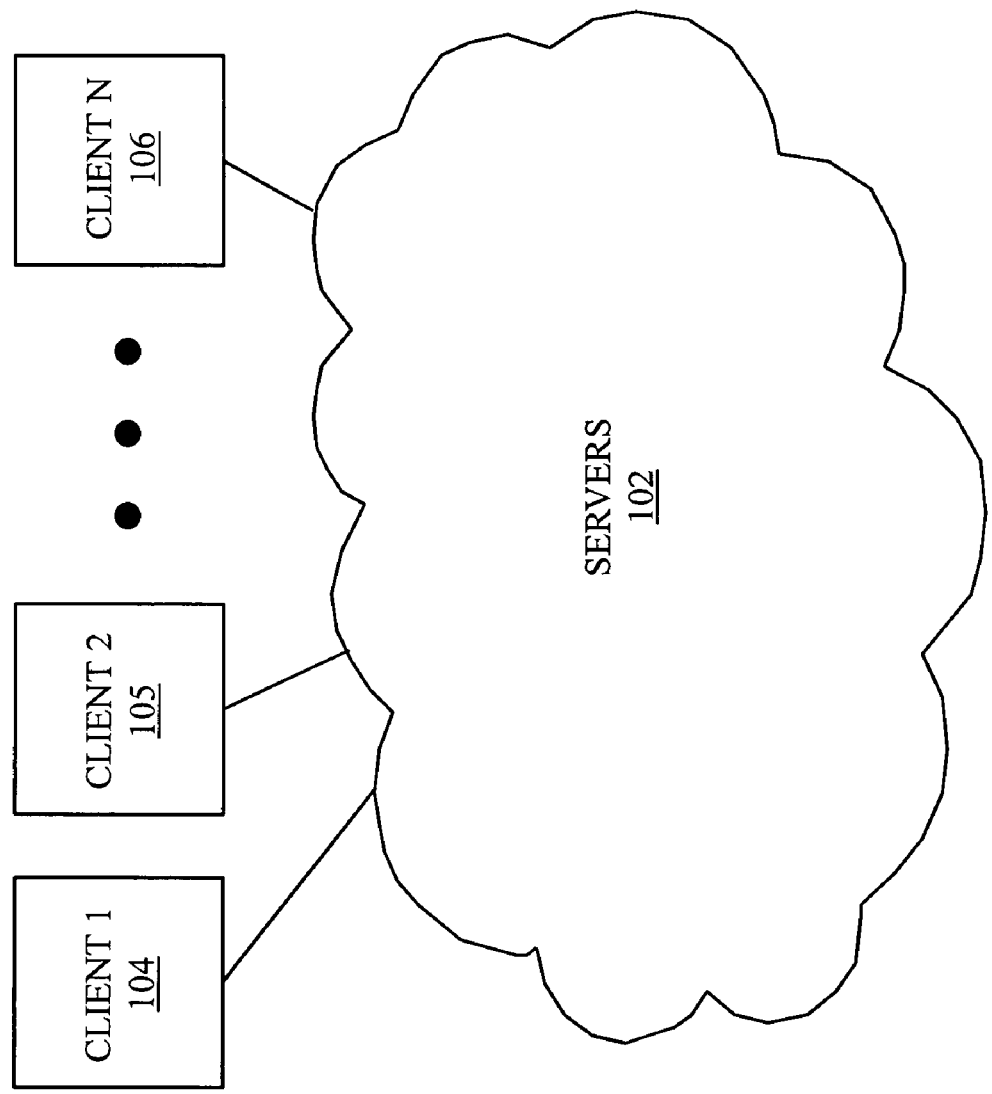
FIG. 1 is a diagram illustrating servers and clients according to an embodiment of the system described herein.

Referring to FIG. 1, a diagram illustrates servers 102 coupled to a plurality of clients 104-106. Each of the clients 104-106 represents one or more processing devices that receives file services from the servers 102. Each of the clients 104-106 may or may not be independent of other ones of the clients 104-106. One or more of the clients 104-106 may be a multiprocessing/multiuser system and possibly have multiple independent users. The clients 104-106 are meant to represent any number of clients.

The file services provided by the servers 102 may include data storage and retrieval as well as related operations, such as data mirroring, cloning, etc. The servers 102 may be implemented using a plurality of services (and/or interconnected file servers including SAN components) that are provided by interconnected processing and/or storage devices. In an embodiment herein, each of the clients 104-106 may be coupled to the servers 102 using the Web, possibly in conjunction with local TCP/IP connections. However, it is possible for one or more of the clients 104-106 to be coupled to the servers 102 using any other appropriate communication mechanism and/or combinations thereof to provide the functionality described herein.

Figure 2B:
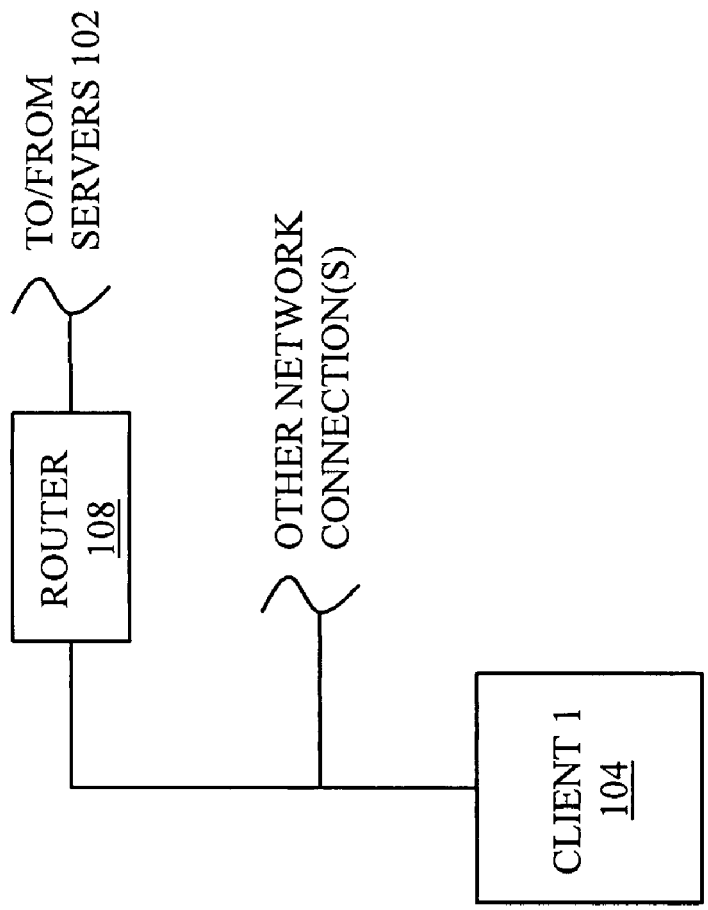
FIGS. 2A and 2B are diagrams illustrating a client coupled to servers and to other network(s) according to an embodiment of the system described herein.
Figure 2A:
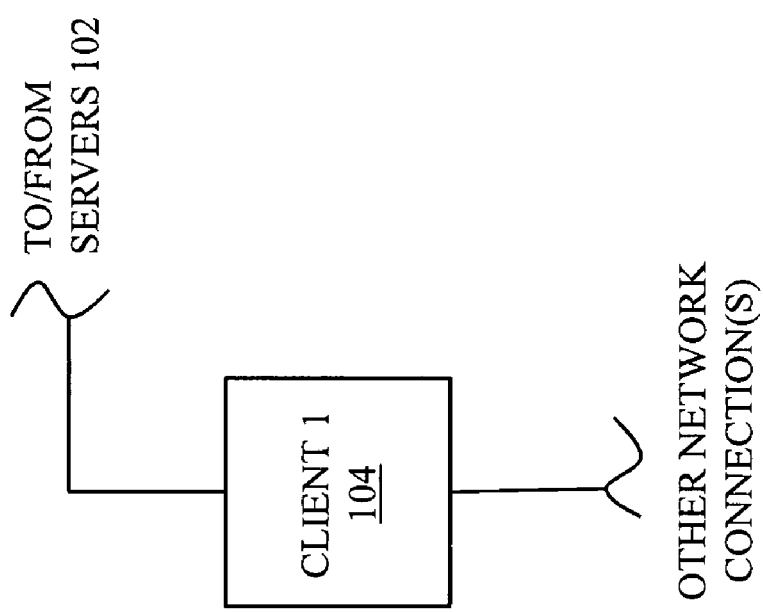

Referring to FIG. 2A, the client 104 is shown as being coupled to the servers 102 and to one or more other network(s). The other network(s) may include a local area network (LAN). Thus, the client 104 may be a gateway between the servers 102 and a LAN to which one or more other devices (not shown) may also be coupled. The client 104 may act as a local file server to the one or more other devices coupled to the LAN by providing data from the servers 102 to the one or more other devices. Of course, it is possible for one or more other clients to simultaneous act as gateways to the same or different other network(s). Generally, for the discussion herein, reference to a particular one of the clients 104-106 may be understood to include reference to any or all of the clients 104-106 coupled to the servers 102 unless otherwise indicated.

Referring to FIG. 2B, a diagram shows the client 104 being coupled to the servers 102 and one or more other network(s) (e.g., a LAN) in a configuration that is different from that shown in FIG. 2A. In the configuration of FIG. 2B, a router 108 is coupled between the servers 102 and the client 104. The router 108 may be any conventional router that may be accessed by the client 104. In the configuration of FIG. 2B, the client 104 uses only a single connection point to both the servers 102 and to the other network(s). In the configuration of FIG. 2B, the client 104 may act as local file server and gateway between the servers 102 and one or more other devices (not shown) coupled to the other network(s). Of course, any other appropriate connection configurations may be used by any of the client 104-106 coupled to the servers 102 and/or to other network(s).

Figure 3:
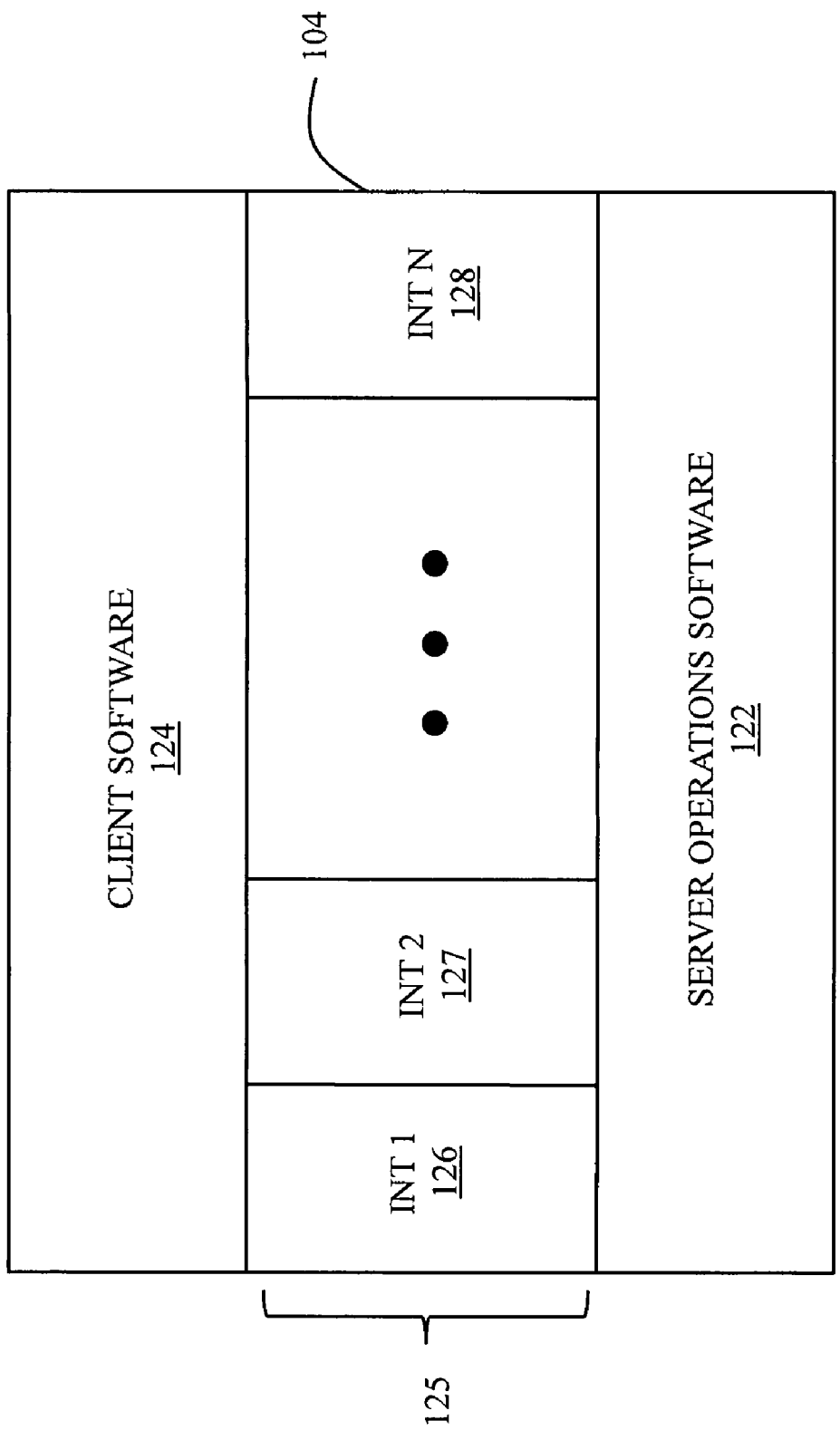
FIG. 3 is a diagram illustrating a client having server operations software, client software, and a plurality of interfaces therebetween according to an embodiment of the system described herein.

Referring to FIG. 3, the client 104 is shown in more detail having server operations software 122, client software 124, and an interface layer 125 that includes a plurality of interfaces 126-128 between the server operations software 122 and the client software 124. The server operations software 122 facilitates the exchange of information/data between the client 104 and the servers 102 to provide the functionality described herein. The server operations software 122 is described in more detail elsewhere herein. The client software 124 represents any software that may be run on the client 104, including application software, operating system software, Web server software, etc., that is not part of the server operations software 122 or the interface layer 125. As described in more detail elsewhere herein, it is possible to have the client software 124 interact with the servers 102 through different ones of the interfaces 126-128 at the same time.

The file services described herein may be implemented by the servers 102 using a set of file objects where a file that is accessed by the client software includes a metadata file object which points to one or more data file objects that contain the data for the file. Accessing the file would involve first accessing the metadata file object to locate the corresponding data file objects for the file. Doing this is described in more detail elsewhere herein. Note, however, that any appropriate file object mechanism may be used for the system described herein.

Figure 4:
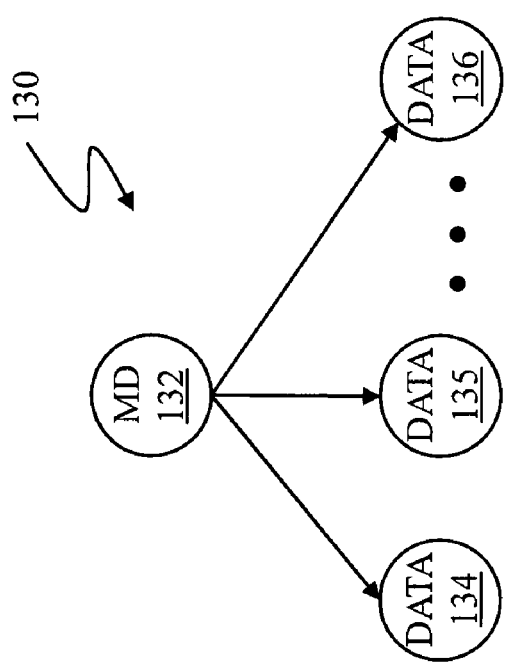
FIG. 4 is a diagram illustrating a file having a metadata file object and a plurality of data file objects according to an embodiment of the system described herein.

Referring to FIG. 4, a file 130 is shown as including a metadata file object 132 and a plurality of data file objects. The metadata file object 132 contains information that points to each of the data file objects 134-136. Accessing the file includes first accessing the metadata file object 132 and then using information therein to locate the appropriate one or more of the corresponding data file object 134-136.

Figure 5:
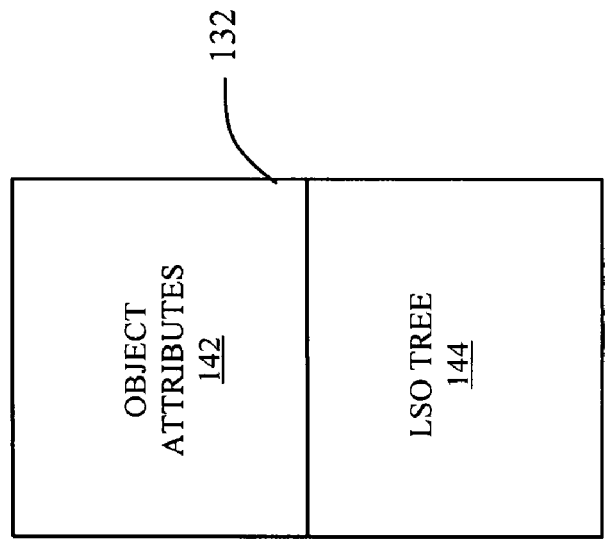
FIG. 5 is a diagram illustrating a metadata file object for a file according to an embodiment of the system described herein.

Referring to FIG. 5, the metadata file object 132 is shown in more detail as including an object attributes section 142 and a Layout Storage Object (LSO) tree section 144. The object attributes section contains conventional file-type attributes such as owner id, group id, access control list, last modification time, last access time, last change time, creation time, file size, and link count. Many of the attributes are self-explanatory. The last modification time corresponds to the last time that the data for the data objects 134-136 had been modified while the last change time corresponds to when the object metadata had last been changed. The link count indicates the number of other objects that reference a particular file (e.g., aliases that point to the same file). In an embodiment herein, a file and its related objects are deleted when the link count is decremented to zero.

The LSO tree section 144 includes a data structure that includes one or more maps for mapping the logical space of the file to particular data file objects. The LSO tree section 144 may also indicate any mirrors for the data and whether the mirrors are synchronous or asynchronous. LSO trees and mirrors are described in more detail elsewhere herein.

Referring to FIG. 6, a simple LSO tree 160 is shown as including an LSO root node 162 and a single map 164. The LSO root node 162 is used to identify the LSO tree 160 and includes links to one or more map(s) used in connection with the file corresponding to the LSO tree 160. The map 164 maps logical locations within the file to actual data storage location. A process that accesses logical storage space of a file represented by the LSO tree 160 first uses the LSO root node 162 to find the map 164 and then uses the map 164 to translate logical addresses within the file to an actual data storage locations.

Referring to FIG. 7, an LSO tree 170 is shown as including an LSO root node 172 and a plurality of maps 174-176. Each of the maps 174-176 may represent a different range of logical offsets within the file corresponding to the LSO tree 170. For example, the map 174 may correspond to a first range of logical offsets in the file. The map 174 may map logical locations in the first range to a first actual storage device. The map 175 may correspond to a second range of logical offsets in the file, different than the first range, which may be mapped to a different actual storage device or may be mapped to the same actual storage device as the map 174. Similarly, the map 176 may correspond to a third range of logical offsets in the file, different than the first range and the second range, which may be mapped to a different actual storage device or may be mapped to the same actual storage device as the map 174 and/or the map 175.

Referring to FIG. 8, an LSO tree 180 is shown as including an LSO root node 181 and a pair of replication nodes 182a, 182b, which indicate that the underlying data is to be mirrored (replicated) and which indicate whether the mirror is synchronous or asynchronous. Synchronous and asynchronous mirrors are discussed in more detail elsewhere herein. The node 182a has a plurality of children maps 183-185 associated therewith while the node 182b has a plurality of children maps 186-188 associated therewith. The replication nodes 182a, 182b indicate that the data corresponding to the maps 183-185 is a mirror of data corresponding to the maps 186-188. In some embodiments, the nodes 182a, 182b may be implemented using a single node 189 to indicate replication.

A process accessing a file having the LSO tree 180 would traverse the tree 180 and determine that data is mirrored. As discussed in more detail elsewhere herein, depending upon the type of mirroring, the process accessing the LSO tree 180 would either write the data to the children of both of the nodes 182a, 182b or would provide a message to another process/server (e.g., the servers 102) that would perform the asynchronous mirroring. Mirroring is discussed in more detail elsewhere herein.

For the system described herein, file objects are accessed by one of the clients 104-106 by first requesting, and obtaining, a lease from the servers 102. The lease corresponds to the file objects for the particular file being accessed and to the type of access. A lease may be for reading, writing, and/or more some other operation (e.g., changing file attributes). In an embodiment herein, for objects corresponding to any particular file, the servers 102 may issue only one write lease at a time to any of the clients 104-106 but may issue multiple read leases simultaneously and may issue read lease(s) at the same time as issuing a write lease. However, in some embodiments it may be possible to obtain a lease for a specified logical range of a file for operations only on that range. Thus, for example, it may be possible for a first client to obtain lease for writing to a first logical range of a file while a second client may, independently, obtain a lease for writing to a second and separate logical range of the same file. The two write leases for different logical ranges may overlap in time without violating the general rule that the system never issues overlapping write leases for the same data.

The lease provided to the clients 104-106 from the servers 102 includes security information (security token) that allows the client appropriate access to the data. The security token may expire after a certain amount of time. In an embodiment herein, a client accesses data by providing an appropriate security token for the data as well as client users/ownership information. Thus, for example, a user wishing to access data would first obtain a lease and then would provide the access request to the servers 102 along with the security token and information identifying the owner (client) accessing the data. The servers 102 would then determine whether the access requested by the client was permissible. After the lease expires (the security token expires), the user requests the lease again. Data security may be implemented using conventional data security mechanisms.

After obtaining a lease for accessing a file, a client may then cache the corresponding metadata, including the LSO tree, into local storage of the client. The client may then use and manipulate the local cached version of the metadata and may use the metadata to obtain access to the data. As described in more detail elsewhere herein, a client does not directly modify metadata stored by the servers 102 but, instead, sends update messages to the servers 102 to signal that metadata for a file may need to be modified by the servers 102.

Figure 9:
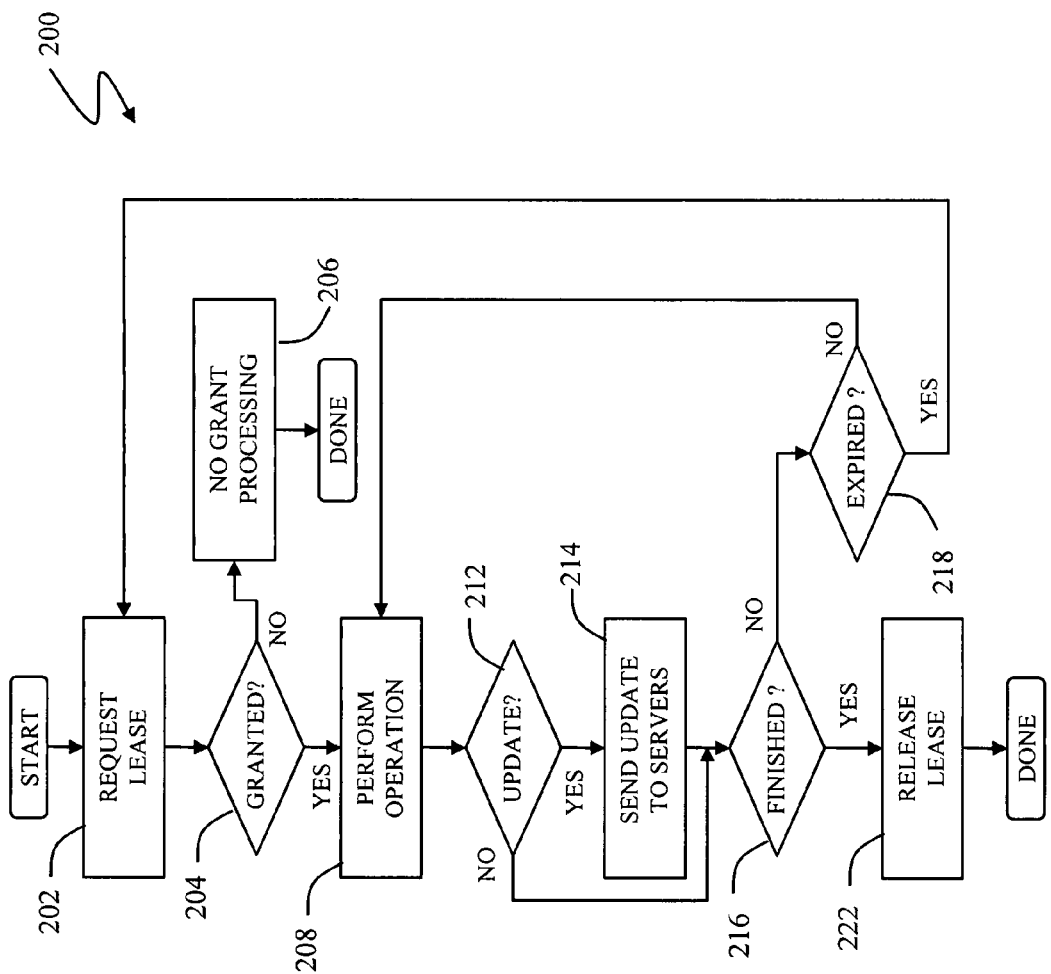
FIG. 9 is a flowchart illustrating a client obtaining a lease for and operating on a file according to an embodiment of the system described herein.

Referring to FIG. 9, a flowchart 200 illustrates steps performed by a client in connection with requesting a lease for a file (objects associated with a file) for performing operations thereon. Processing begins at a first step 202 where the client requests the lease for the file. As discussed in more detail elsewhere herein, a client requesting a lease includes specifying the type of access (e.g., read, write, etc.). Following the step 202 is a test step 204 where it is determined if the request has been granted. If not, then control transfers from the test step 204 to a step 206 where processing is performed in connection with the lease not being granted to the client. The particular processing performed at the step 206 may include, for example, providing an error message to the client process requesting access to the file corresponding to the lease and/or waiting for an amount of time and then retrying the request. Note that it is possible that a lease for a particular file is not available at one time is subsequently available at another time because, for example, the lease is released by another client in between the first request and the second request. In any event, any appropriate processing may be performed at the step 206. Following the step 206, processing is complete.

If it is determined at the test step 204 that the least requested at the step 202 has been granted, then control transfers from the test step 204 to a step 208 where the client performs an operation using the file for which the lease was granted. Operations performed at the step 208 include reading data and/or writing data. Different types of processing that may be performed at the step 208 are described in more detail elsewhere herein.

Following the step 208 is a test step 212 where it is determined if the operations performed at the step 208 require an update. In some instances, a client may obtain a lease and perform operations that do not affect the file or the underlying file objects. For example, a client may acquire a lease for reading a file and the operation performed at the step 208 may include the client reading the file. In such a case, no update may be necessary since the file and corresponding file objects (metadata, data objects, etc.) have not changed. On the other hand, if the client obtains a lease for writing data the file and the operation performed at the step 208 includes writing data to the file, then the underlying file objects will have been changed and an update message needs to be sent the servers 102. If it is determined at the test step 212 that an update is necessary, then control passes from the test step 212 to a step 214 where an update message is sent by the client to the servers 102.

Following the step 214, or following the step 212 if no update is necessary, control passes to a test step 216 where it is determined if the client is finished with the file. In some instances, the client may perform a small number of operations on the file, after which the client would be finished with the file at the step 216. In other cases, the client may be performing a series of operations and may not yet have completed all of the operations.

If it is determined at the test step 216 that the client is not finished with the file, then control passes from the test step 216 to a test step 218 where it is determined if the lease for the file has expired. Note that a lease may be provided by the servers 102 to the client with a particular expiration time and/or the associated security token may expire. In addition, it may be possible for the servers 102 to recall leases provided to clients under certain circumstances. In either case, the lease may no longer be valid. Accordingly, if it is determined at the step 218 that the lease has expired (and/or has been recalled by the servers 102), then control passes from the test step 218 back to the step 202 request the lease again. Otherwise, if the lease has not expired, then control passes from the test step 218 back to the step 208 to perform another iteration.

If it is determined at the test step 216 that the client is finished with the file, then control passes from the test step 216 to a step 222 where the client releases the lease by sending a message to the servers 102 indicating that the client no longer needs the lease. Once the client releases the lease, it may be available for other clients. Following the step 222, processing is complete.

In an embodiment herein, data file objects may be indicated as having one of four possible states: current, stale, immutable, or empty. The current state indicates that the data object is up to date and current. The stale state indicates that the data is not valid but, instead, requires updating, perhaps by some other process. In some instances, the stale state may be used only in connection with mirror copies of data (explained in more detail elsewhere herein). Data may be stale because it is a mirror of other data that was recently written but not yet copied. The immutable state indicates that the corresponding data is write protected, perhaps in connection with a previous clone (snapshot) operation. The empty state indicates that no actual storage space has yet been allocated for the data.

Figure 10:
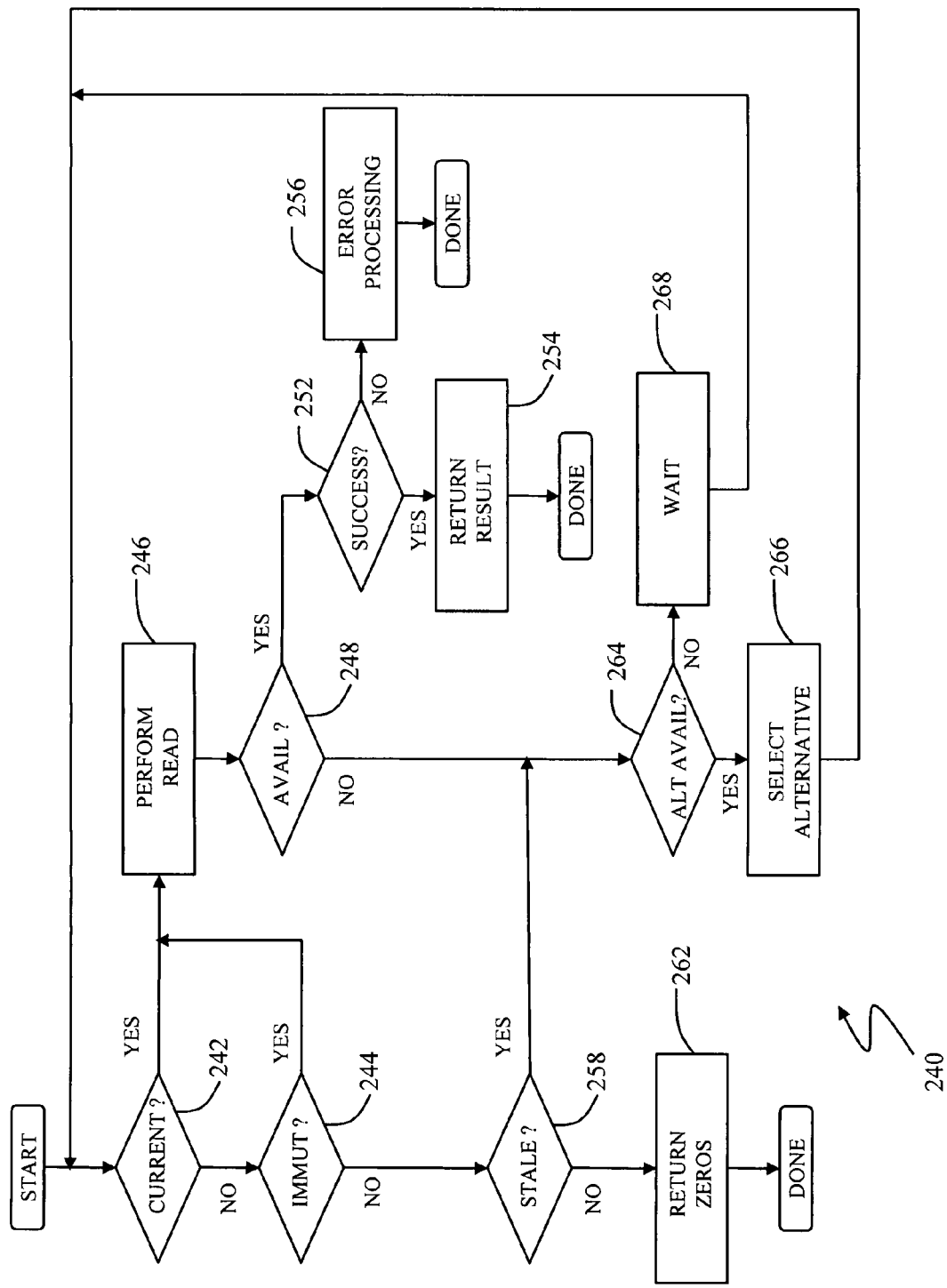
FIG. 10 is a flowchart illustrating a client reading data from a file according to an embodiment of the system described herein.

Referring to FIG. 10, a flow chart 240 illustrates steps performed by a client in connection with performing read operations after obtaining a read lease for a file. Processing begins at a first test step 242 where it is determined if the data object being read is in the current state. If not, then control transfers from the test step 242 to a step 244 where it is determined if the data object being read is in the immutable state. If it is determined at the step 244 that the data object being read is in the immutable state or if it is determined at the test step 242 that the data object being read is in the current state, then control transfers to a step 246 where the read operation is performed. A client reads file data by providing the appropriate data file object identifier to the servers 102 as well as providing appropriate security credentials. Accordingly, the read operation performed at the step 246 includes the client sending an appropriate request to the servers 102 and waiting for a result therefrom.

Following the step 246 is a test step 248 where it is determined if the servers 102 have returned a result indicating that the data file object is unavailable. In some cases, a data file object that is otherwise current or immutable may nevertheless become unavailable. For example, the physical storage space that holds the data file object may become temporarily disconnected and/or temporarily busy doing some other operation. If it is determined at the test step 248 that the data file object is available, then control transfers from the test step 248 to a test step 252 where it is determined if the read operation was successful. If so, then control transfers from the test step 252 to a step 254 where the result of the read operation is returned to the process at the client that caused the read operation to be performed. The result may include the data that was read and a status indicator. Following the step 254, processing is complete.

If it is determined at the test step 252 that the read operation performed at the step 246 was not successful, then control transfers from the test step 252 to a step 256 where error processing is performed. The particular error processing performed at the step 256 is implementation dependent and may include, for example, reporting the error to a calling process and/or possibly retrying the read operation a specified number of times. Following the step 256, processing is complete.

If it is determined at the test step 244 that the data object being read is not in the immutable state, then control transfers from the test step 244 to a test step 258 where it is determined if the data object is in the stale state. If not, then, by virtue of the test steps 242, 244, 258 and process of elimination, the data object is in the empty state. In an embodiment herein, reading a data object in the empty state causes zeros to be returned to the calling process. Accordingly, if it is determined at the test step 258 that the data object is not in the stale state, then control transfers from the test step 258 to a step 262 where zeros are returned in response to the read operation. Following the step 262, processing is complete.

If it is determined at the test step 258 that the data file object is in the stale state, or if it is determined at the test step 248 that the data file object is not available, then control transfers to a test step 264 to determine if an alternative version of the data file object is available for reading. As discussed in more detail elsewhere herein, there may be multiple versions of the same data file objects that exist at the same time due to mirroring. Accordingly, if the data file object being read is in the stale state or otherwise unavailable, it may be possible to read a mirror copy of the data file object that may be in the current state. The test performed at the step 264 is described in more detail elsewhere herein.

If it is determined at the test step 264 that an alternative version of the data file object is available, then control transfers from the test step 264 to a step 266 where the alternative version of the data file object is selected for use. Following the step 266, control transfers back to the test step 242 for another iteration with the alternative data file object.

If it is determined at the test step 264 that an alternative version of the data file object is not available, then control transfers from the test step 264 to a step 268 where the client process waits. In an embodiment herein, it may be desirable to wait for a data file object to become current and/or available. Following the step 268, control transfers back to the step 242 for another iteration. Note that, instead of waiting at the step 268, processing may proceed from the step 264 to the step 256 to perform error processing if there is no alternative data file object available. In other embodiments, it may be possible to perform the step 268 a certain number of times and then, if the data file object is still unavailable or in the stale state and there is no alternative data file object, then perform the error processing at the step 256.

Figure 11:
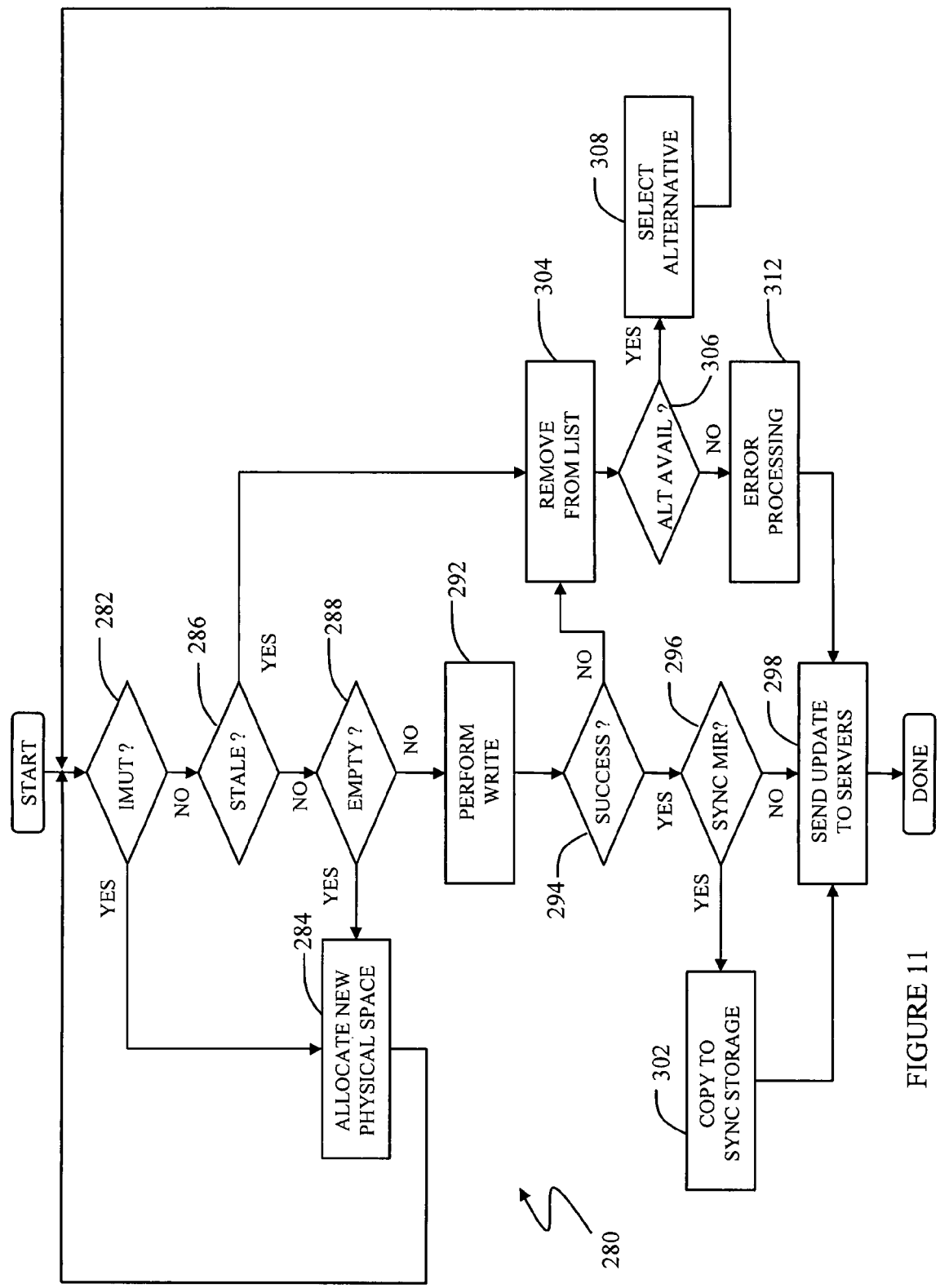
FIG. 11 is a flowchart illustrating a client writing data to a file according to an embodiment of the system described herein.

Referring to FIG. 11, a flow chart 280 illustrates steps performed by a client in connection with performing write operations after obtaining a write lease for a file. Processing begins at a first test step 282 where it is determined if the data file object to which the write is being performed is in the immutable state. If so, then control transfers from the step 282 to a step 284 where new actual storage space is allocated for the data file object to avoid overwriting the immutable data. Allocating new storage space for a data object may include providing an appropriate request to the servers 102. Following the step 284, control transfers back to the step 282 to begin the processing for the write operation again.

If it is determined at the step 282 that the data file object to which the write is being performed is not in the immutable state, then control transfers from the step 282 to a step 286 where it is determined if the data file object to which the write is being performed is in the stale state. If not, then control transfers from the test step 286 to a test step 288 where it is determined if the data file object to which the write is being performed is in the empty state. If so, then control transfers from the step 288 to the step 284, discussed above, where new physical storage space is allocated. Following the step 284, control transfers back to the step 282 to begin the processing for the write operation again.

If it is determined at the step 288 that the data file object to which the write is being performed is not in the empty state, then control transfers from the test step 288 to a step 292 where the write operation is performed. Note that the step 292 is reached if the data file object to which the write operation is being performed is not in the immutable state, not in the stale state, and not in the empty state (and thus is in the current state). A client writes file data by providing the appropriate data file object location identifier to the servers 102 as well as providing appropriate security credentials. Accordingly, the write operation performed at the step 292 includes the client sending an appropriate request to the servers 102 and waiting for a result therefrom.

Following the step 292 is a test step 294 where it is determined if the write operation performed at the step 292 was successful. If so, then control transfers from the test step 294 to a test step 296 where it is determined if there are synchronous mirrors of the data file object to which the write is being performed. The test performed at the step 296 may include, for example, determining if a parent node of the data file object in the file LSO tree indicates replication. If not, then control transfers from the test step 296 to a step 298 where an update (message) is sent to the servers 102 indicating that the write had been performed. Following the step 298, processing is complete.

If it is determined at the test step 296 that there are synchronous mirrors of the data file object to which the write is being performed, then control passes from the test step 296 to a step 302 where the data that was written at the step 292 is also written to the synchronous mirror(s). The processing performed at the step 302 is discussed in more detail elsewhere herein. Following the step 302, control transfers to the step 298, discussed above, where an update (message) is sent to the servers 102. Following the step 298, processing is complete.

If it is determined at the test step 294 that the write operation performed at the step 292 was not successful, or if it is determined at the test step 286 that the data file object to which the write operation is being performed is in the stale state, then control transfers to a step 304 where the data file object to which the write is attempting to be performed is removed from the client's local copy of the LSO tree. At the end of the write operation illustrated by the flow chart 280, the client may inform the servers 102 (at the step 298) of the difficulty in writing to the data object so that the servers 102 can take appropriate action, if necessary.

Following the step 304 is a test step 306 where it is determined if an alternative version of the data is available. As discussed in more detail elsewhere herein, there may be multiple versions of the same data file objects that exist at the same time due to mirroring. Accordingly, if the data file object to which the write operation is being performed is stale or otherwise cannot be written to, it may be possible to write to a mirror copy of the data. The test performed at the step 306 is like the test performed at the step 264 and is described in more detail elsewhere herein. If it is determined at the test step 306 that an alternative version of the data corresponding to the data file object is available, then control transfers from the test step 306 to a step 308 where the alternative version is selected for writing. Following the step 308, control transfers back to the test step 282 for another iteration with the alternative data file object.

If it is determined at the test step 306 that an alternative version of the data corresponding to the data file object is not available, then control transfers from the test step 306 to a step 312 to perform error processing if there is no alternative available. The particular error processing performed at the step 312 is implementation dependent and may include, for example, reporting the error to a calling process and/or possibly retrying the write operation a specified number of times before reporting the error. Following the step 312, control transfers to the step 298, discussed above, to send update information to the servers 102. Following the step 298, processing is complete.

Figure 12:
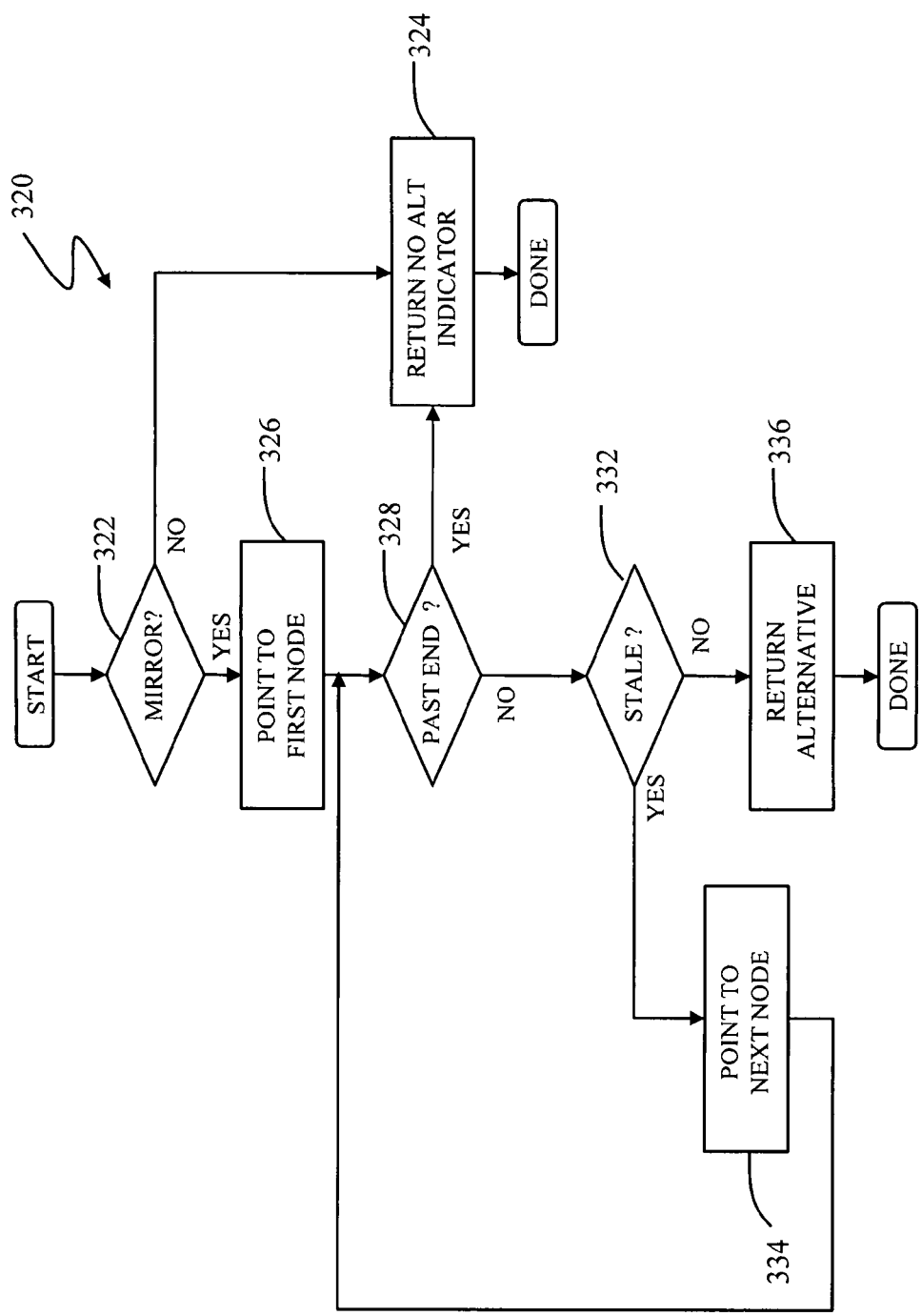
FIG. 12 is a flowchart illustrating steps performed by a client in connection with finding an alternative copy of data according to an embodiment of the system described herein.

Referring to FIG. 12, a flow chart 320 illustrates in more detail steps performed in connection with the alternative available test step 264 of FIG. 10 and/or the alternative available test step 306 of FIG. 11. Processing begins at a first test step 322 where it is determined if the file has any mirror data file objects at all. In some instances, a file may not use mirrors, in which case there would be no alternative copy available. Accordingly, if it is determined at the test step 322 that the file does not have any mirror data file objects, then control transfers from the test step 322 to a step 324 where a value is returned indicating that no alternative copies are available. Following the step 324, processing is complete.

If it is determined at the test step 322 that mirror copies are available, then control transfers from the test step 322 to a step 326 where a pointer is made to point to a first mirror data file object. For the processing discussed herein, a pointer may be used to iterate through mirror data file objects to find a useable data file object. Following the step 326 is a test step 328 where it is determined if the pointer is past the end of the list of mirror data file objects (has iterated through all of the mirror data file objects). If so, then control passes from the test step 328 to the step 324, discussed above, to return a value that indicates that no alternatives are available.

If it is determined at the test step 328 that the pointer is not past the end of a list of mirror data file objects, then control transfers from the test step 328 to a test step 332 where it is determined if the pointer points to a data file object in a stale state. If so, then control transfers from the test step 332 to a step 334 where the pointer is made to point to the next data file object to be examined. Following the step 334, control transfers back to the step 328, discussed above, for another iteration. If it is determined at the test step 332 that the pointer does not point to a data file object in the stale state, then control transfers from the test step 332 to a step 336 where the data file object that is pointed to by the pointer is returned as an alternative data file object that may be used by the calling process. Following the step 336, processing is complete.

Figure 13:
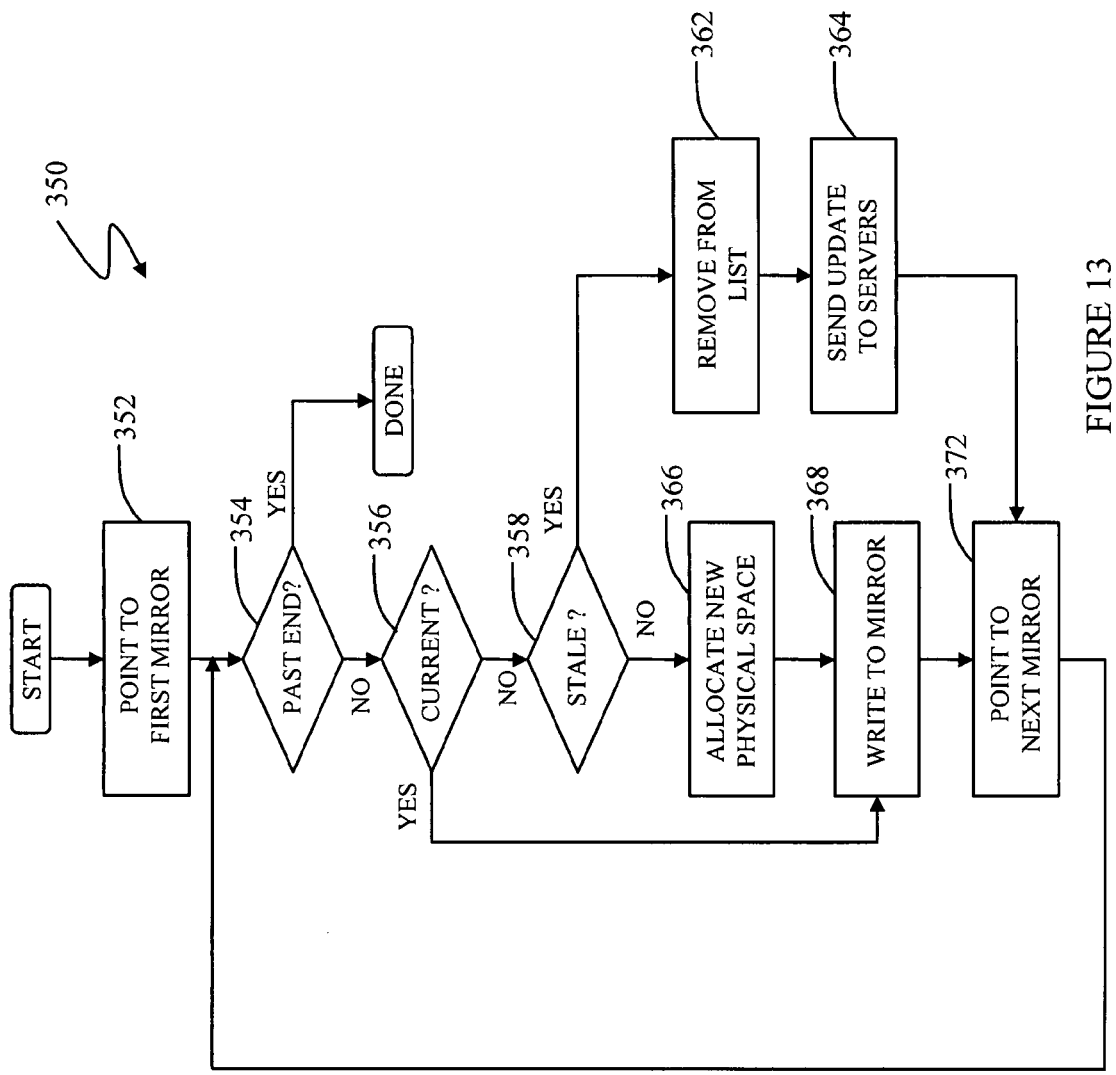
FIG. 13 is a flowchart illustrating a client writing to synchronous mirrors for data according to an embodiment of the system described herein.

Referring to FIG. 13, a flow chart 350 illustrates in more detail operations performed in connection with the step 302 of the flow chart 280 of FIG. 11 where data that has been written is copied to a number of synchronous mirrors (mirror data file objects). Processing begins at a first step 352 where a pointer that is used to iterate through the mirror data file objects is set to point the first one of the mirror data file objects. Following the step 352 is a test step 354 where it is determined if the pointer used for iterating through the mirror data file objects points past the end (i.e., if all of the mirror data file objects have been processed). If so, then processing is complete. Otherwise, control transfers from the test step 354 to a test step 356 where it is determined if the status of the mirror data file object pointed to by the pointer indicates that the mirror data file object is current. If not, then control passes from the test step 356 to a test step 358 where it is determined if the status of the mirror data file object pointed to by the pointer indicates that the mirror data file object is in the stale state. If so, then control passes from the test step 358 to a step 362 where the mirror data file object is removed from the client's local copy of the LSO tree. In an embodiment herein, a synchronous mirror data file object should not be in a stale state and, if that occurs, it may indicate an error condition. Accordingly, following the step 362 is a step 364 where information about the stale mirror is sent to the servers 102, which may perform recovery processing in response thereto.

Note that if a mirror data file object is neither in the stale state nor in the current state, then the mirror data file object is either in the empty state or in the immutable state. In either case, it may be necessary to allocate new space for a data file object to which the data is to be written. Accordingly, if it is determined at the test step 358 that the data file object is not in the stale state, then control passes from the test step 358 to a step 366 where new space is allocated for the mirror data file object. Following the step 366 is a step 368 where the data that is being copied across synchronous mirror data file objects is written to the mirror data file object pointed to by the pointer used to iterate through the mirror data file objects. Note that the step 368 may also be reached from the test step 356 if it is determined that the mirror data file object is current. Following the step 368 is a step 372 where the pointer used to iterate through the mirror data file objects is made to point to the next one. Note that the step 372 is also reached following the step 364. Following the step 372, control transfers back to the test step 354 for another iteration.

The system described herein may access file objects using object identifiers. In an embodiment herein, each file object that is stored among the servers 102 may be assigned a unique object identifier that identifies each file object and distinguishes each file object from other file objects in the system. However, many applications use a file naming structure and/or a hierarchical directory to access files and data therein. For example, a file name "C:\ABC\DEF\GHI.doc" indicates a file called "GHI.doc" stored in a sub-directory "DEF" that is stored in another directory "ABC" located on a root volume "C". A nested directory structure may be provided by implementing directories as special files that are stored in other directories. In the example given above, the sub-directory "DEF" may be implemented as a file stored in the directory "ABC".

The system described herein may present to applications a conventional naming structure and directory hierarchy by translating conventional file names into file object identifiers. Such a translation service may be used by other services in connection with file operations. In an embodiment herein, each directory may include a table that correlates file names and sub-directory names with file object identifiers. The system may examine one directory at a time and traverse sub-directories until a target file is reached.

Figure 14:
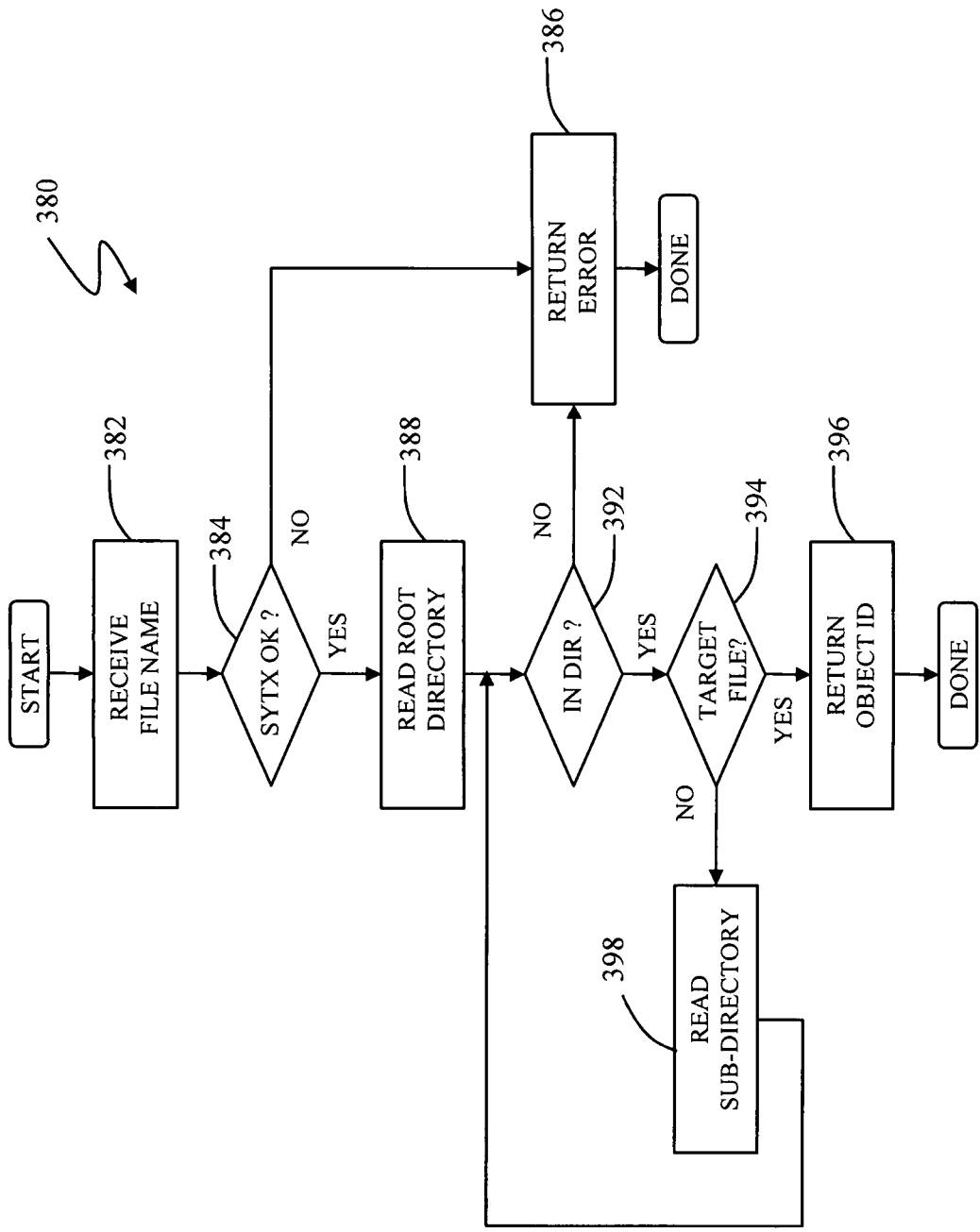
FIG. 14 is a flow chart illustrating a client converting file names to object identifiers according to an embodiment of the system described herein.

Referring to FIG. 14, a flow chart 380 illustrates steps performed in connection with providing a file name translation service (file name service) that translates a conventional hierarchical file name into a file object identifier. The file name service may receive a conventional hierarchical file name as an input and may return an object identifier (or, in some cases, an error). Processing begins at a first step 382 where the file name service receives a file name, such as a conventional hierarchical file name. Following the step 382 is a test step 384 where it is determined if the syntax of the file name is OK. Checking the syntax of a hierarchical file name is know and includes, for example, checking that only appropriate characters have been used. If it is determined at the test step 384 that the syntax is not OK, then control transfers from the test step 384 to a step 386 where an error indicator (error message) is returned to the calling process. Following the step 386, processing is complete.

If it is determined at the test step 384 that the syntax of the provided name is OK, then control transfers from the test step 384 to a step 388 where the root directory is read. In an embodiment herein, all file name paths begin at a single common root directory used for all file objects stored in the servers 102. In other embodiments, there may be multiple root directories where specification of a particular root directory may be provided by any appropriate means, such as using a volume identifier, specifically selecting a particular root directory, etc.

Following the step 388 is a test step 392 where it is determined if the target file (or sub-directory that is part of the file name path) is in the directory that has been read. If not, then control passes from the test step 392 to the step 386, discussed above, where an error is returned. In some embodiments, the file-not-found error that results from the test at the step 392 may be different from the syntax error that results from the test at the step 384.

If it is determined that the target file or a sub-directory that is part of the file name path is in the directory that has just been read, then control passes from the test step 392 to a test step 394 where it is determined if the directory that has just been read contains the target file (as opposed to containing a sub-directory that is part of the file name path). If so, then control passes from the test step 394 to a step 396 where the object identifier of the target file object is returned to the calling process. Following the step 396, processing is complete.

If it is determined at the test step 394 that the directory that has just been read contains a sub-directory that is part of the file name path, then control transfers from the test step 394 to a step 398 where the sub-directory is read so that the sub-directory becomes the directory being examined. In effect, processing at the step 398 traverses the chain of subdirectories to eventually get to the target file. Following the step 398, control transfers back to the step 392, discussed above, for a next iteration.

Figure 15:
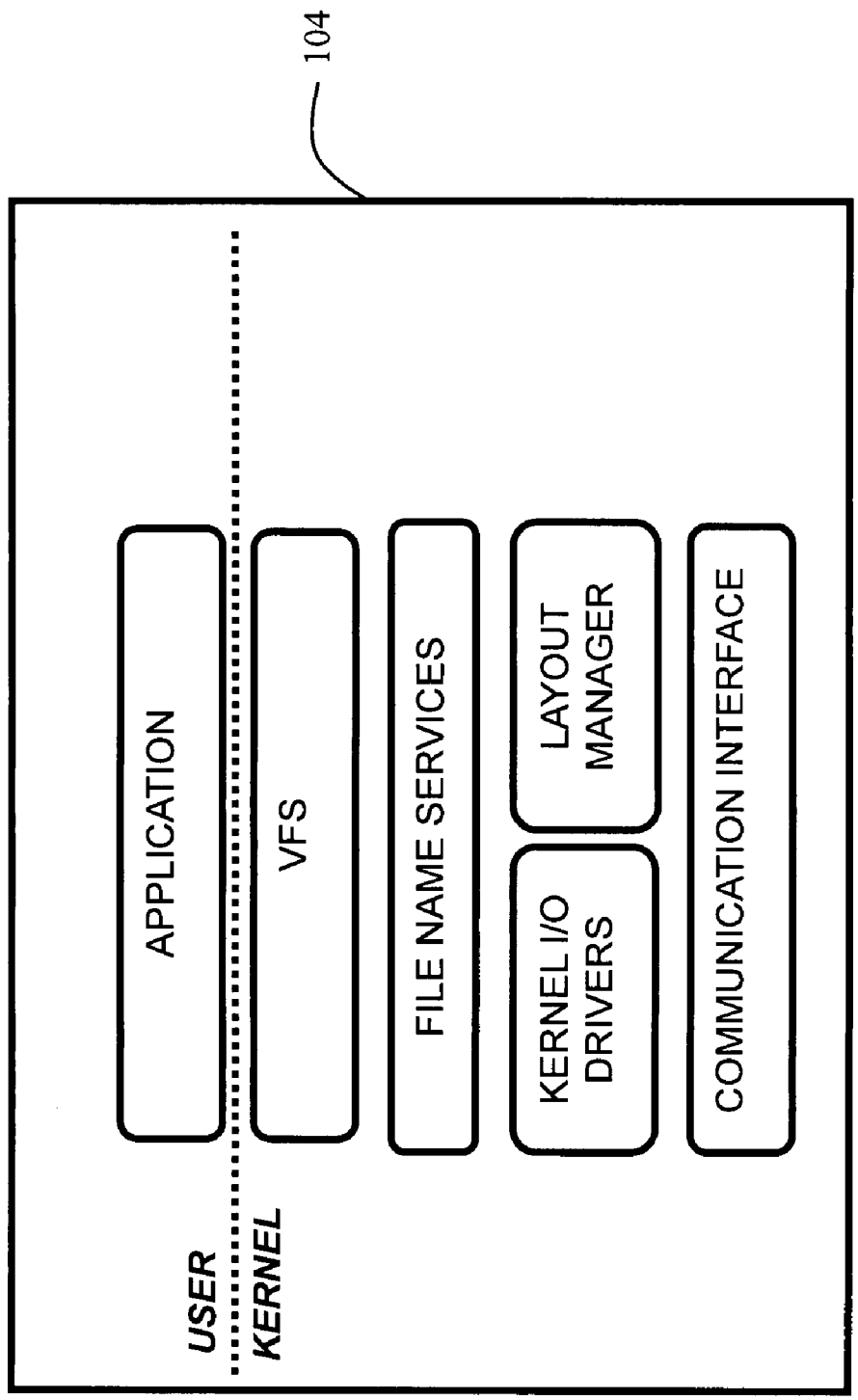
FIG. 15 is a diagram illustrating a client having an application in user memory address space and a having a VFS, file name services, kernel I/O drivers, layout manager, and a communication interface in kernel memory address space according to an embodiment of the system described herein.

Referring to FIG. 15, a diagram shows the client 104 as including user address memory space and kernel address memory space. In an embodiment herein, user address memory space is memory space that is generally used by user applications and related processes while kernel address memory space is memory space that is generally accessible only by system processes, such as an operating system kernel and related processes. As discussed in more detail herein, it is possible to have different portions of the system described herein reside and operate in the user memory space and/or the kernel memory space. In addition, it is possible for the client 104 to have multiple different interfaces to access file objects at the servers.

In FIG. 15, the client 104 is shown as including an application in the user memory address space and a virtual file system (VFS), file name services, kernel I/O drivers, a layout manager, and a communication interface in the kernel memory address space. The VFS is an abstraction layer on top of a more concrete file system. The purpose of a VFS is to allow client applications to access different types of concrete file systems in a uniform way. The VFS allows the application running on the client 104 to access file objects on the servers 102 without the application needing to understand the details of the underlying file system. The VFS may be implemented in a conventional fashion by translating file system calls by the application into file object manipulations and vice versa. For example, the VFS may translate file system calls such as open, read, write, close, etc. into file object calls such as create object, delete object, etc.

The VFS may use the file name services, described elsewhere herein, to translate file names into object identifiers. The kernel I/O drivers provide an interface to low-level object level I/O operations. The kernel I/O drivers may be modeled after, and be similar to, Linux I/O drivers. The layout manager may perform some of the processing on LSO trees corresponding to files, as discussed in more detail elsewhere herein. The communication interface provides communication between the client 104 and the servers 102. The communication interface may be implemented using any appropriate communication mechanism. For example, if the client 104 communicates with the servers 102 via an Internet connection, then the communication interface may use TCP/IP to facilitate communication between the servers 102 and the client 104.

The application of FIG. 15 may correspond to the client software 124 of FIG. 3. The VFS of FIG. 15 may correspond to one of the interfaces 126-128 of FIG. 3. The file name services, kernel I/O drivers, layout manager, and communication interface of FIG. 15 may correspond to the server operations software 122 of FIG. 3. Similar correlation between components of FIG. 3 and other figures may also be found.

Figure 16:
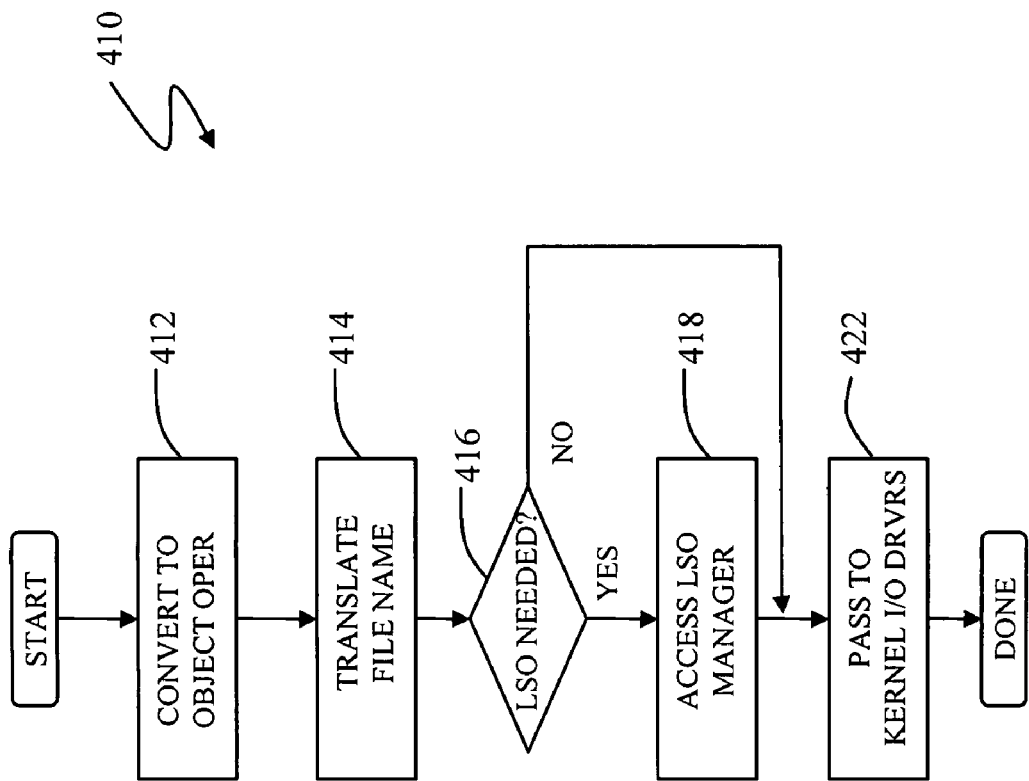
FIG. 16 is a flow chart illustrating operation of a VFS at a client according to an embodiment of the system described herein.

Referring to FIG. 16, a flow chart 410 illustrates steps performed by a VFS to provide file services in connection with an application running on the client 104. Processing begins at a first step 412 where a file system operation requested by an application may be translated into one or more object operations. For example, a file operation to open a file for reading may be converted to object operations that include obtaining an object lease for reading as discussed elsewhere herein. Following the step 412 is a step 414 where the VFS translates the file name into an object identifiers using the file name services discussed above in connection with FIG. 14. Operations that follow may be performed using the object identifiers obtained at the step 414.

Following the step 414 is a test step 416 where it is determined if the requested operation requires the LSO tree. As discussed elsewhere herein, operations such as read, write, etc. use LSO trees corresponding to file objects. However, some possible file operations may not require accessing a corresponding LSO tree. If it is determined at the test step 416 that the LSO tree is needed, then control transfers from the test step 416 to a step 418 where the VFS accesses the LSO manager to perform the necessary operations. For example, for a read operation, the LSO manager may perform processing like that illustrated in the flow chart 240 of FIG. 10. Following the step 418, or following the step 416 if the LSO is not needed, is a step 422 where the operations are passed to low level kernel I/O drivers (e.g., via one or more appropriate API's). The kernel I/O drivers use the communication module to communicate between the client 104 and the servers 102 in connection with performing the requested operation(s). In instances where the application running on the client 104 has requested data and/or other information from the servers 102, the data and/or information may be passed back up through the communication interface, kernel I/O drivers, etc. to the VFS and ultimately to the application.

Figure 17:
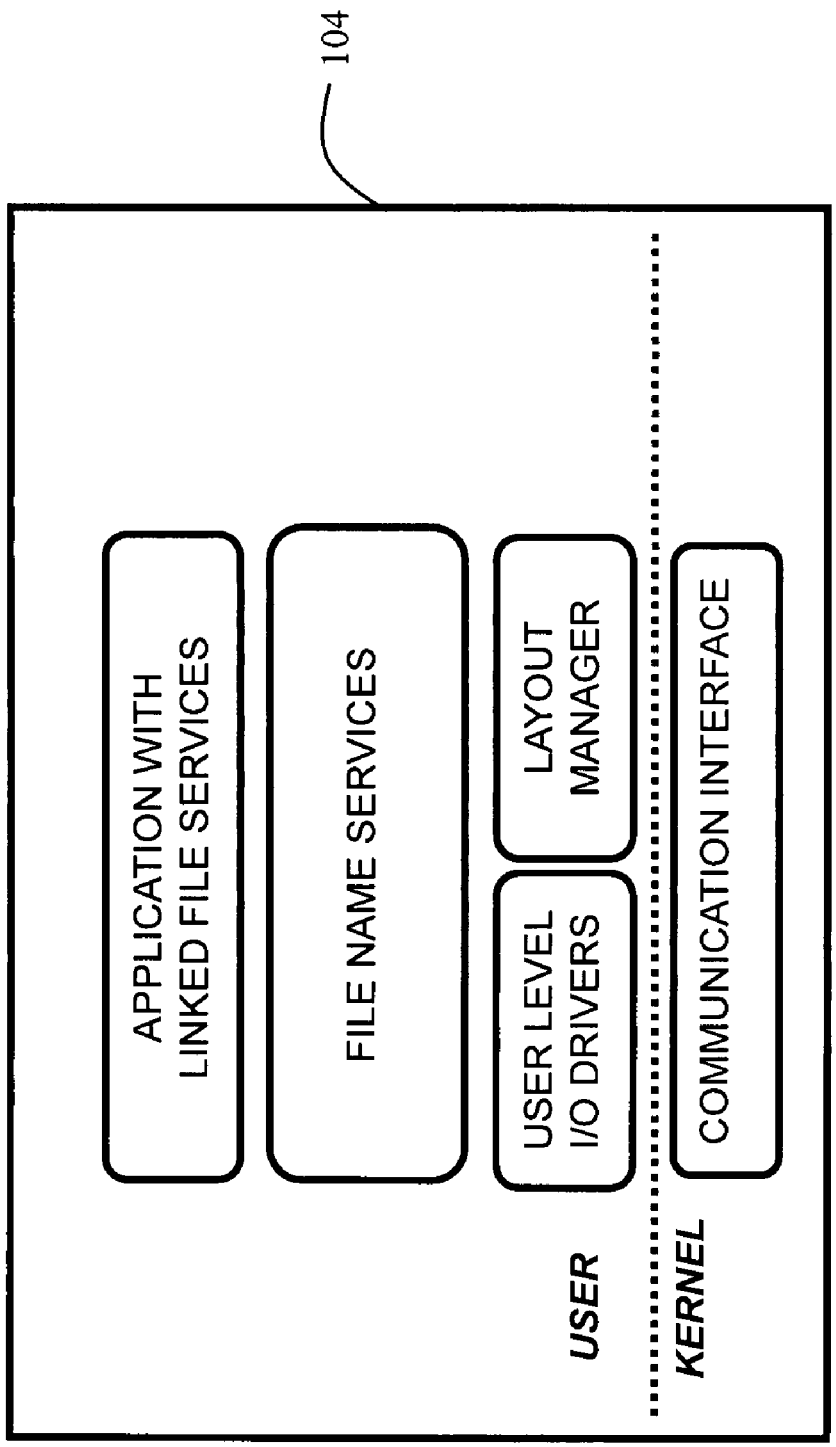
FIG. 17 is a diagram illustrating a client having an application, file name services, user level I/O drivers, and a layout manager in user memory address space and having a communication interface in kernel memory address space according to an embodiment of the system described herein.

Referring to FIG. 17, the client 104 is shown as having an application, file name services, user level I/O drivers, and a layout manager all provided in user memory address space. The functionality of the VFS that was shown in FIG. 15 and described above may be performed instead by library routines linked to the application, and thus are part of the application. These routines would provide functionality like that discussed above in connection with FIG. 16. Accordingly, it is the application that uses the file name services and makes calls to the user level I/O drivers (like the kernel I/O drivers) and to the layout manager. The communication interface is still maintained in the kernel memory address space.

Note that, for the configuration of FIG. 15, modifications are provided by modifying system processes (the operating system), which is disadvantageous for a number of reasons. For example, if the client 104 is a multiuser computing system, then modifying the operating system may involve restarting the entire system and thus disrupting all of the users. In contrast, the configuration of FIG. 17 is advantageous since it allows modification of the system in the application/user memory address space so that the operating system of the client 104 does not need to be modified. However, the configuration of FIG. 17 does not use a VFS, and thus does not obtain the advantageous separation of the application from the file system that is provided by the VFS in FIG. 15.

Figure 18:
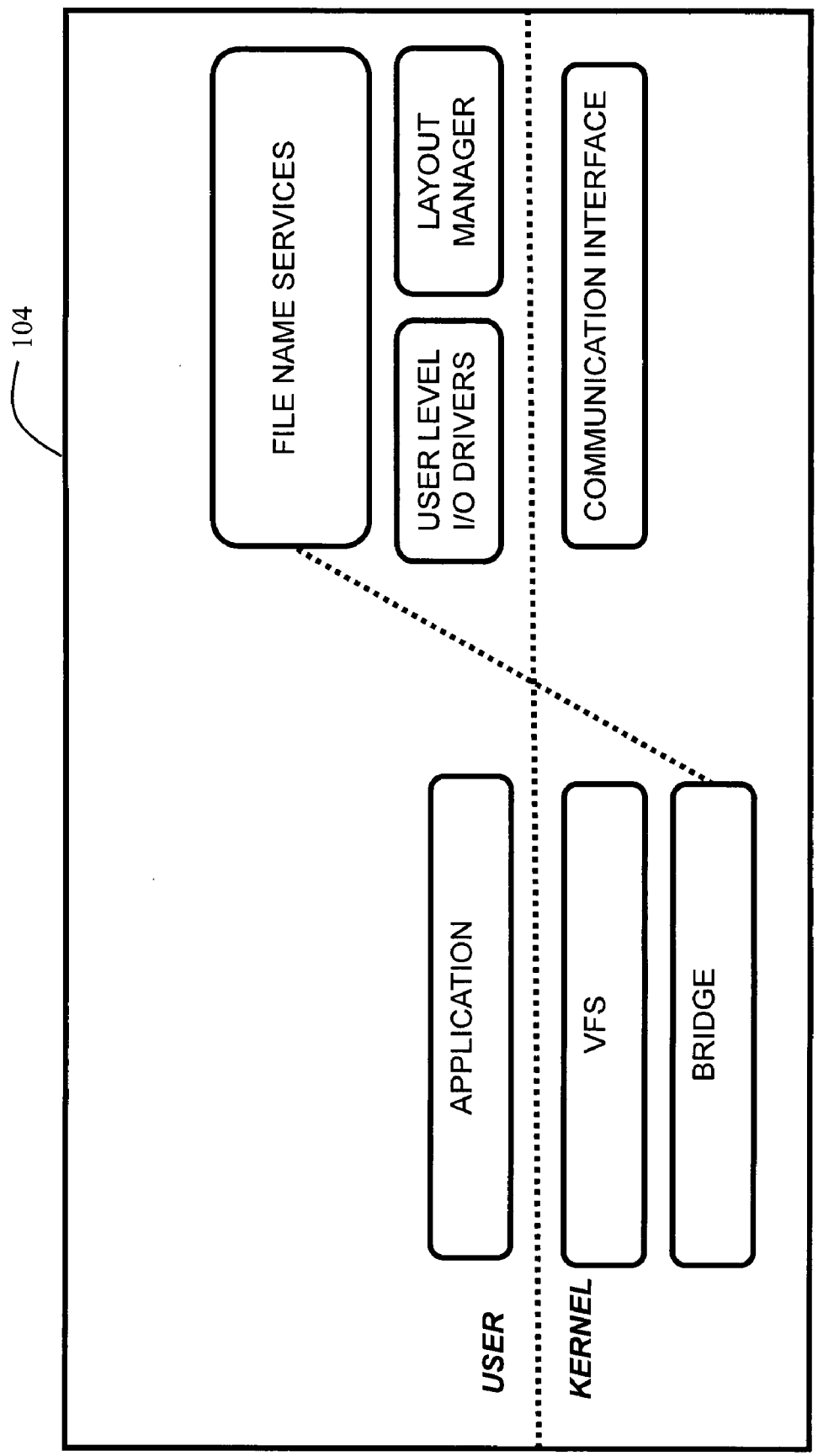
FIG. 18 is a diagram illustrating a client having an application, a file presentation layer, user level I/O drivers, and a layout manager in user memory address space and having a VFS and communication interface and a kernel memory address space to user memory address space bridge in kernel memory address space according to an embodiment of the system described herein.

Referring to FIG. 18, the client 104 is shown as having an application in user memory address space that accesses file objects through a VFS in kernel memory address space like that illustrated in FIG. 15. However, the file name services, I/O drivers, and the layout manager all reside in the user memory address space like the system illustrated in FIG. 17. The VFS communicates with components in the user memory address space through a bridge between kernel memory address space and user memory address space, such as a FUSE (or similar) interface. The bridge allows file system components to be provided in user memory space instead of kernel address memory space while still preserving the VFS in the kernel address memory space. Thus, the configuration illustrated by FIG. 18 provides the advantages of using a VFS, as illustrated in the configuration of FIG. 15, along with the advantages of having file system components in the user address memory space, as illustrated in the configuration of FIG. 17.

It is possible in some instances to have applications and/or other processing in the user memory address space of the client 104 access file objects directly, rather than through a file services layer like the VFS and/or equivalent functionality provided by user linkable libraries (e.g., the configuration illustrated in FIG. 17). Accessing file objects directly may include invoking routines that create objects, read objects, modify objects, delete objects, etc. In such a case, the application would need to know how to interpret and/or manipulate the object data, which may not always be desirable. For example, an application that accesses file objects through the VFS may not need to take into account (or even know about) the structure of an LSO tree while an application that accesses objects directly may need to use the LSO tree. On the other hand, removing the file services layer may provide an opportunity for optimizations not otherwise available. Note that, since the servers 102 exchange object information/operations with the clients 104-106, the servers 102 may not need to distinguish or be able to distinguish between application on the clients 104-106 using a file system interface (file services like the VFS) and those that are not.

Figure 19:
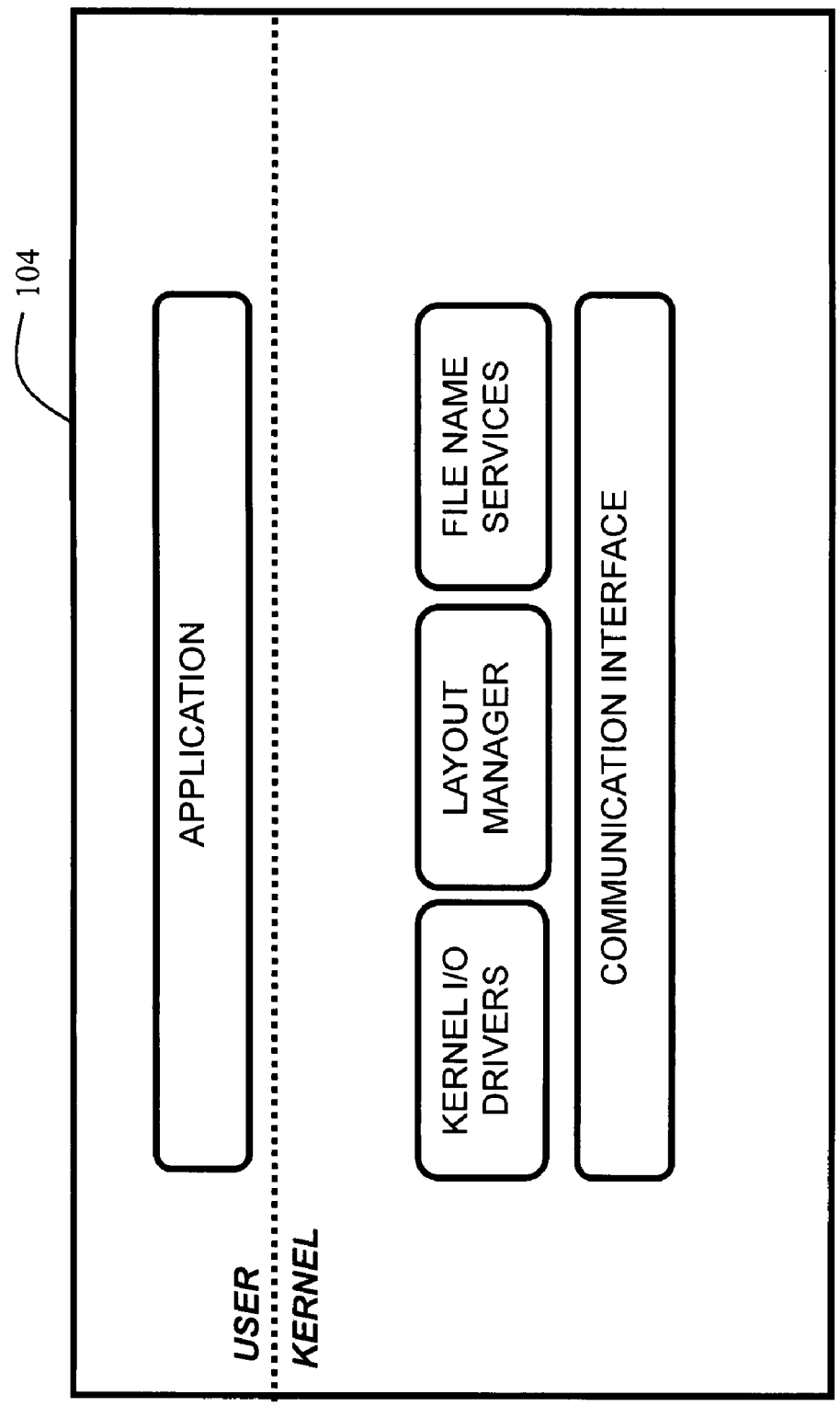
FIG. 19 is a diagram illustrating a client having an application in user memory address space and having file name services, kernel I/O drivers, a layout manager, and a communication interface in kernel address space according to an embodiment of the system described herein.

Referring to FIG. 19, the client 104 is shown as including an application in the user memory address space and kernel I/O drivers, a layout manager, and file name services in the kernel memory address space. The configuration illustrated in FIG. 19 is like that illustrated in FIG. 15, except that the VFS is not used. In the configuration illustrated in FIG. 19, the application could directly access the file name services, the kernel I/O drivers, and the layout manager. The communication interface in the kernel memory address space communicates with the servers 102 just as in other configurations. The direct access illustrated in FIG. 19 allows applications to manipulate file objects (via, for example, appropriate API's) while access via the VFS (or similar) allows applications to accesses file objects indirectly through file system calls to the VFS.

Figure 20:
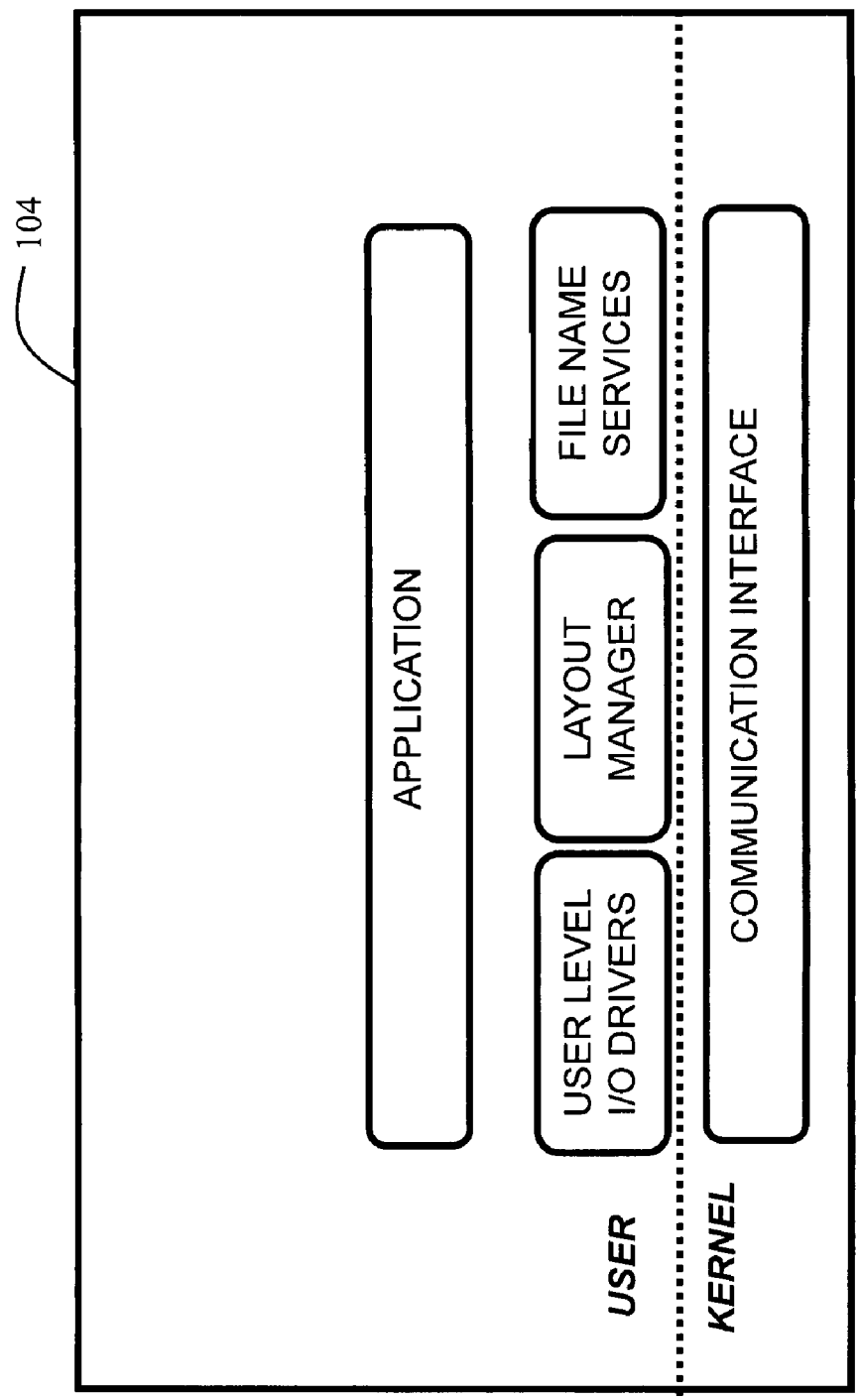
FIG. 20 is a diagram illustrating a client having an application, file name services, user level I/O drivers, and a layout manager in user memory address space and having a communication interface in kernel memory address space according to an embodiment of the system described herein.

Referring to FIG. 20, the client 104 is shown as having an application, user level I/O drivers, a layout manager, and file name services all provided in user memory address space. The configuration shown in FIG. 20 is like that shown in FIG. 17. However, as set forth above, the configuration of FIG. 17 includes file service libraries that are linked into, and thus part of, the application. In contrast, in the configuration of FIG. 20, the application is not linked into libraries with extensive file services. Instead, like the application of the configuration illustrated in FIG. 19, the application in the configuration of FIG. 20 uses minimal file services and, instead, uses and operates upon file objects directly using the user level I/O drivers, the layout manager and, if a file name translation is needed, the file name services.

Figure 21:
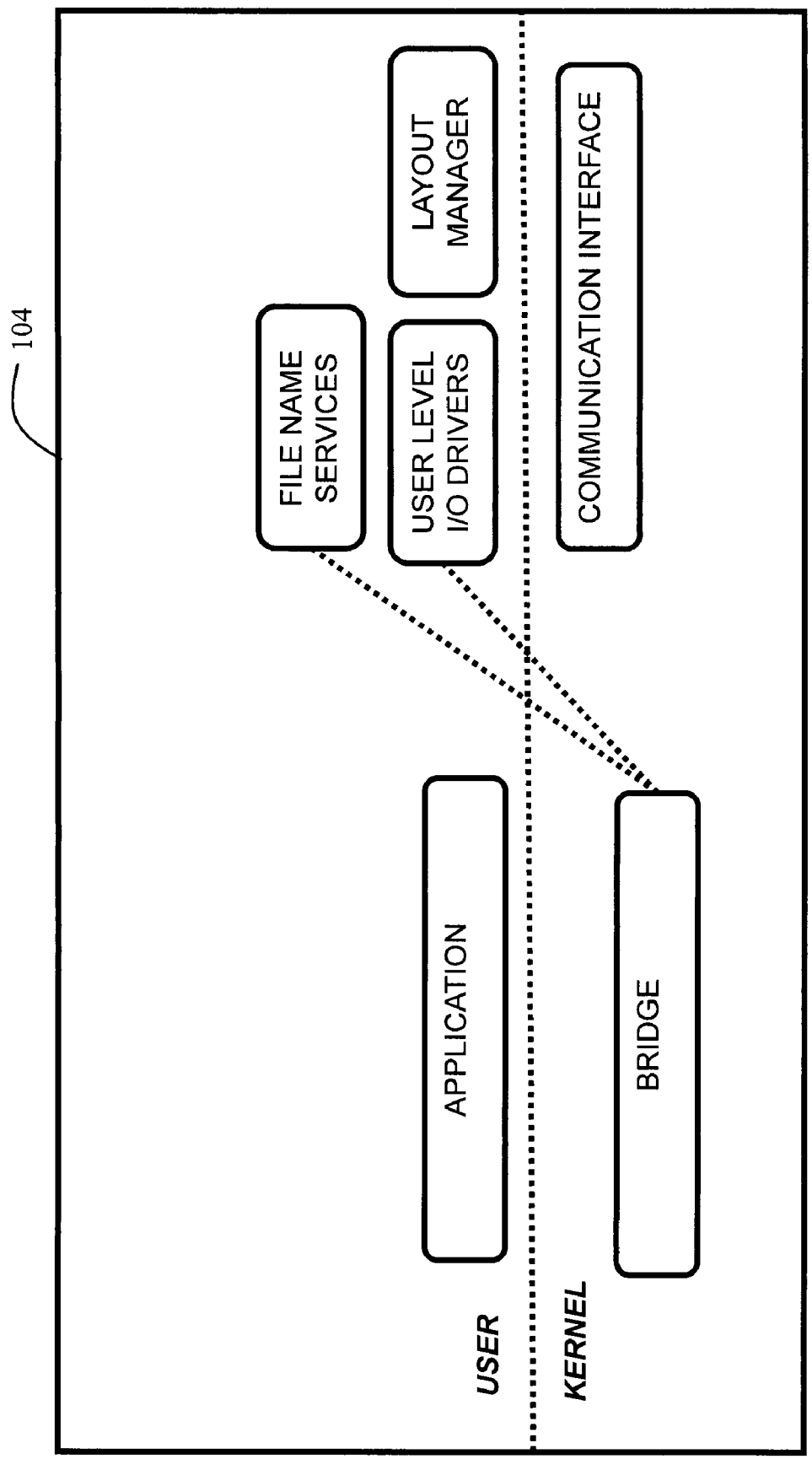
FIG. 21 is a diagram illustrating a client having an application, file name services, user level I/O drivers, and a layout manager in user memory address space and having a communication interface and a kernel memory address space to user memory address space bridge in kernel memory address space according to an embodiment of the system described herein.

Referring to FIG. 21, the client 104 is shown as having an application in user memory address space and a bridge in the kernel memory address space. File name services, user level I/O drivers, and a layout manager are provided in user memory address space. However, unlike the configuration of FIG. 20, the application does not make direct calls to the file system components in the user memory address space. Instead, the application calls the file system components indirectly through the bridge. Just as with the configuration illustrated in FIG. 18, the configuration of FIG. 21 advantageously locates file system components in the user memory address space and, at the same time, provides a kernel memory address space layer between the application and the file system components.

Figure 22:
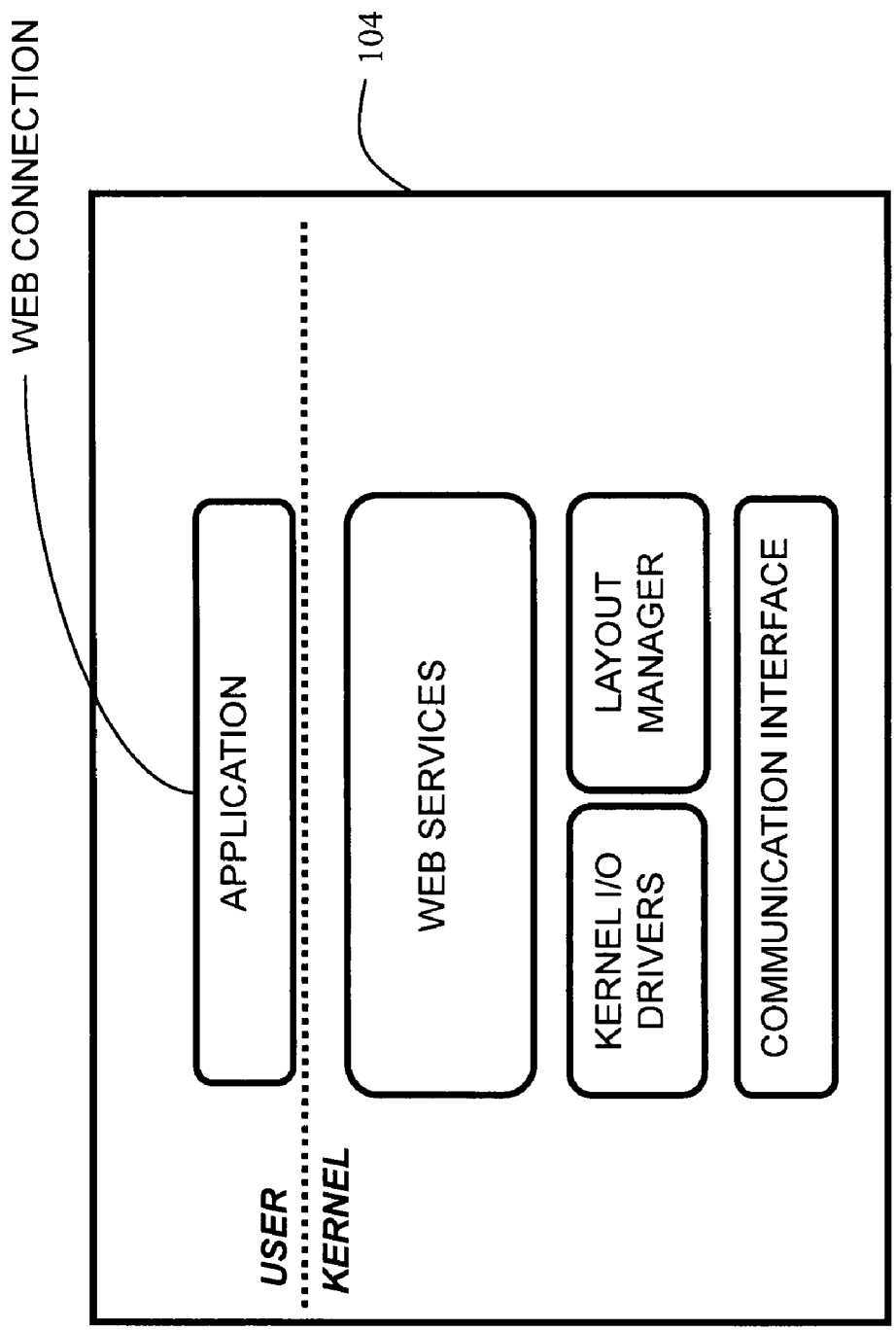
FIG. 22 is a diagram illustrating a client having an application in user memory address space and having a Web Services module, kernel I/O drivers, a layout manager, and a communication interface in kernel memory address space according to an embodiment of the system described herein.

Referring to FIG. 22, the client 104 is shown as having an application in user memory address space and a Web Services module in kernel memory address space. The application may be a Web server application or any application that handles communication with the Web. In an embodiment herein, the application allows communication with the client 104, which acts as a Web server to other computing devices (not shown) that access the client 104 through a Web connection.

The configuration illustrated in FIG. 22 provides Web Services in a manner similar to the file services and/or file object access provided by other configurations. However, the Web Services receives requests/data via a Web data protocol, such as HTML, and provides responses/data also in a Web data protocol, which may be the same or different from the protocol used for requests/data. Operations handled by the Web Services may include object-level operations such as create object, delete object, read object, modify object, modify object metadata, etc. It is also possible to provide more file system level operations, via the Web Services, that open files, read data from files, etc. by including at least some of the functionality of the file services, described elsewhere herein, with the Web Services. The Web Services may present to the other computing devices a conventional well-known Web Services protocol, such as REST or SOAP, or may provide any other appropriate protocol.

Figure 23:
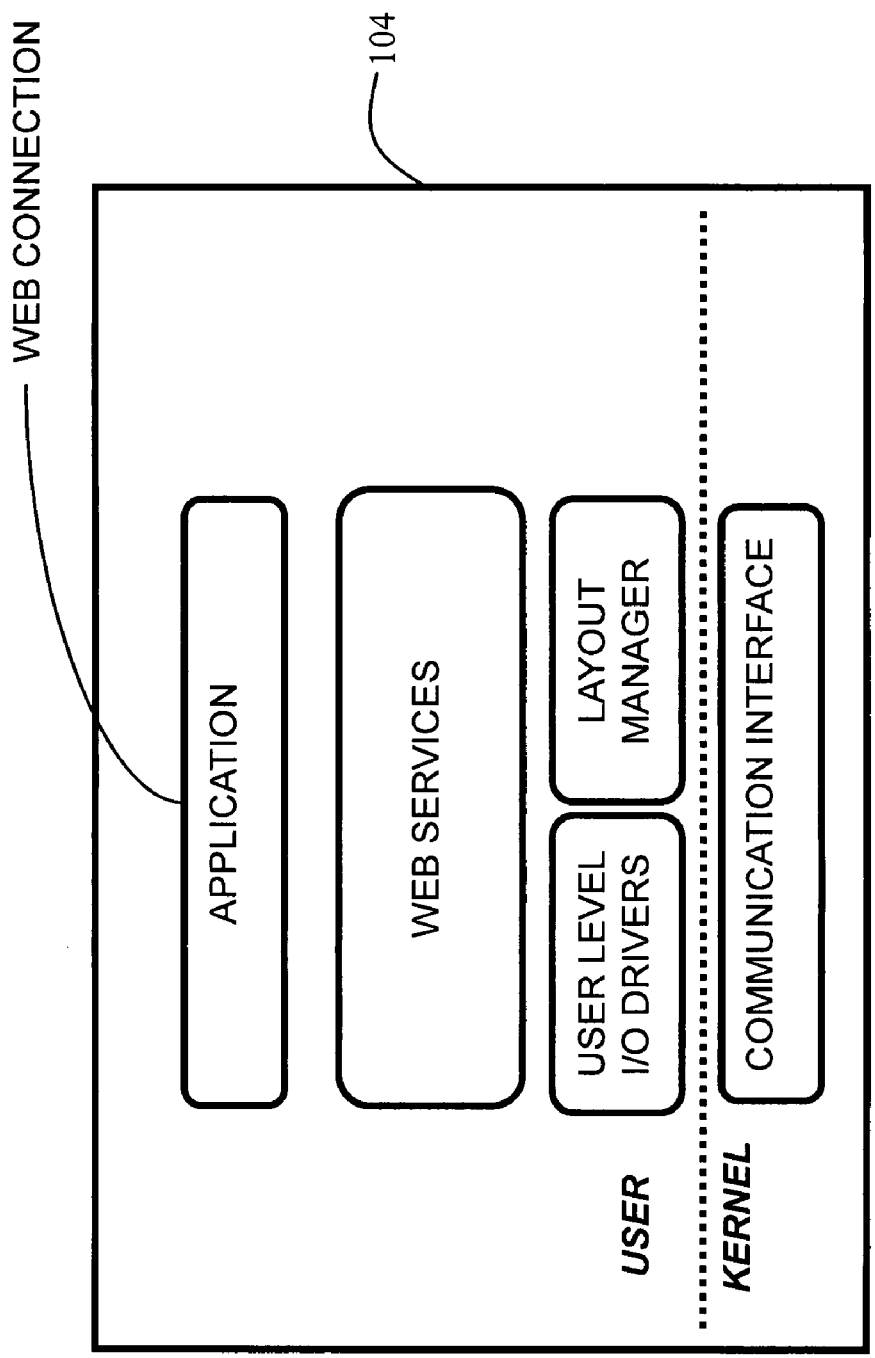
FIG. 23 is a diagram illustrating a client having an application, a Web Services layer, user level I/O drivers, and a layout manager in user memory address space and having a communication interface in kernel memory address space according to an embodiment of the system described herein.

Referring to FIG. 23, the client 104 is shown as having an application, Web Services, user level I/O drivers, and a layout manager in user memory address space. The application may include a Web connection that allows communication with the client 104, which acts as a Web server to other computing devices (not shown) that access the client 104 through the Web connection. The configuration of FIG. 23 is like that of FIG. 17 and FIG. 20. The advantages of the configuration shown in FIG. 23 over the configuration shown in FIG. 22 is that, generally, changes to the configuration shown in FIG. 23 do not require reconfiguring kernel memory address space processes.

Figure 24:
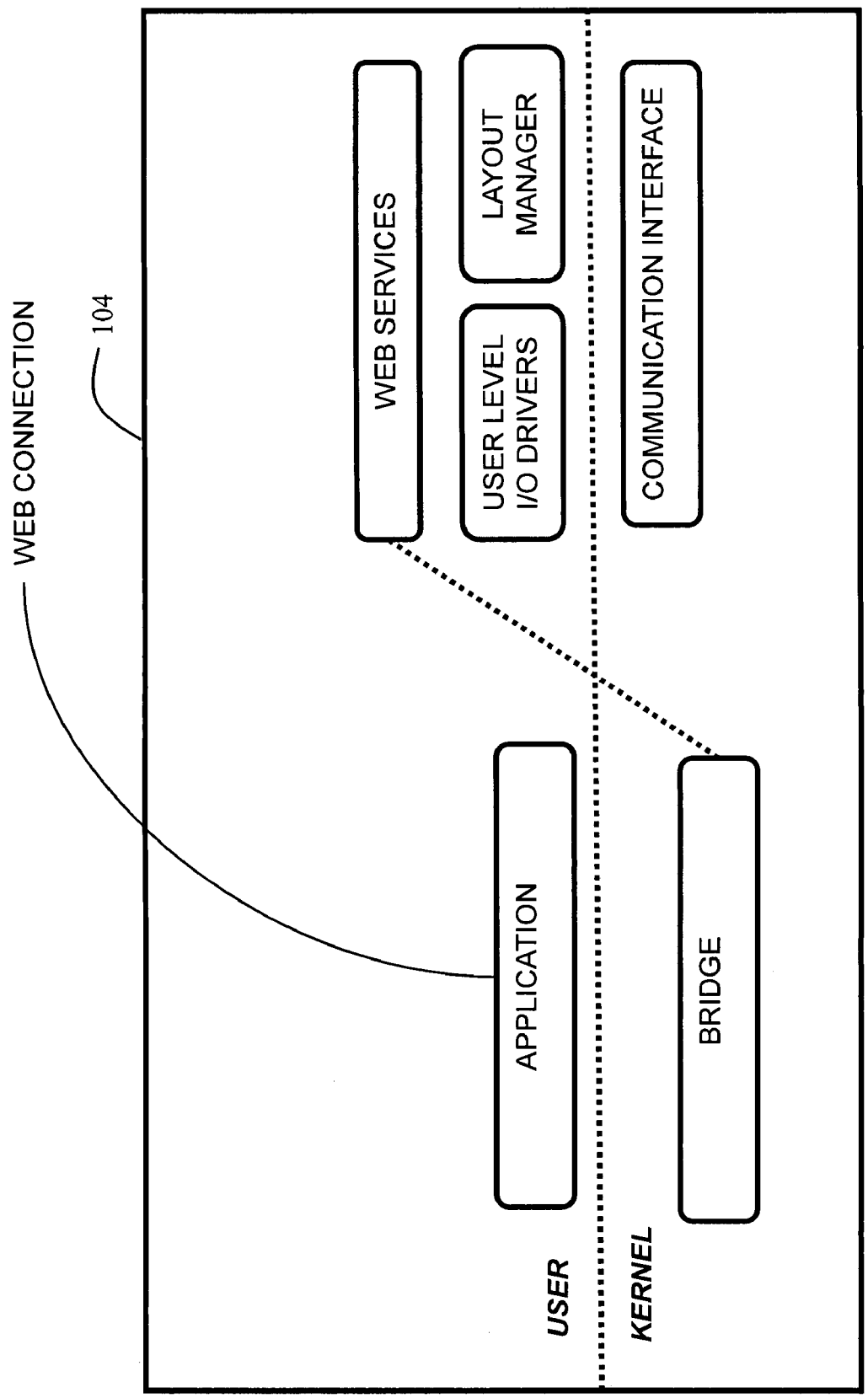
FIG. 24 is a diagram illustrating a client having an application, a Web Services layer, user level I/O drivers, and a layout manager in user memory address space and having a communication interface and a kernel memory address space to user memory address space bridge in kernel memory address space according to an embodiment of the system described herein.

Referring to FIG. 24, the 104 is shown as having an application, Web Services, user level I/O drivers, and a layout manager in user memory address space. The application may include a Web connection that allows communication with the client 104, which acts as a Web server to other computing devices (not shown) that access the client 104 through the Web connection. A bridge is provided in the kernel memory address space. The configuration of FIG. 24 has similar advantages to the configuration shown in FIG. 23, but also has the advantages provided by providing the bridge, discussed elsewhere herein.

Figure 25:
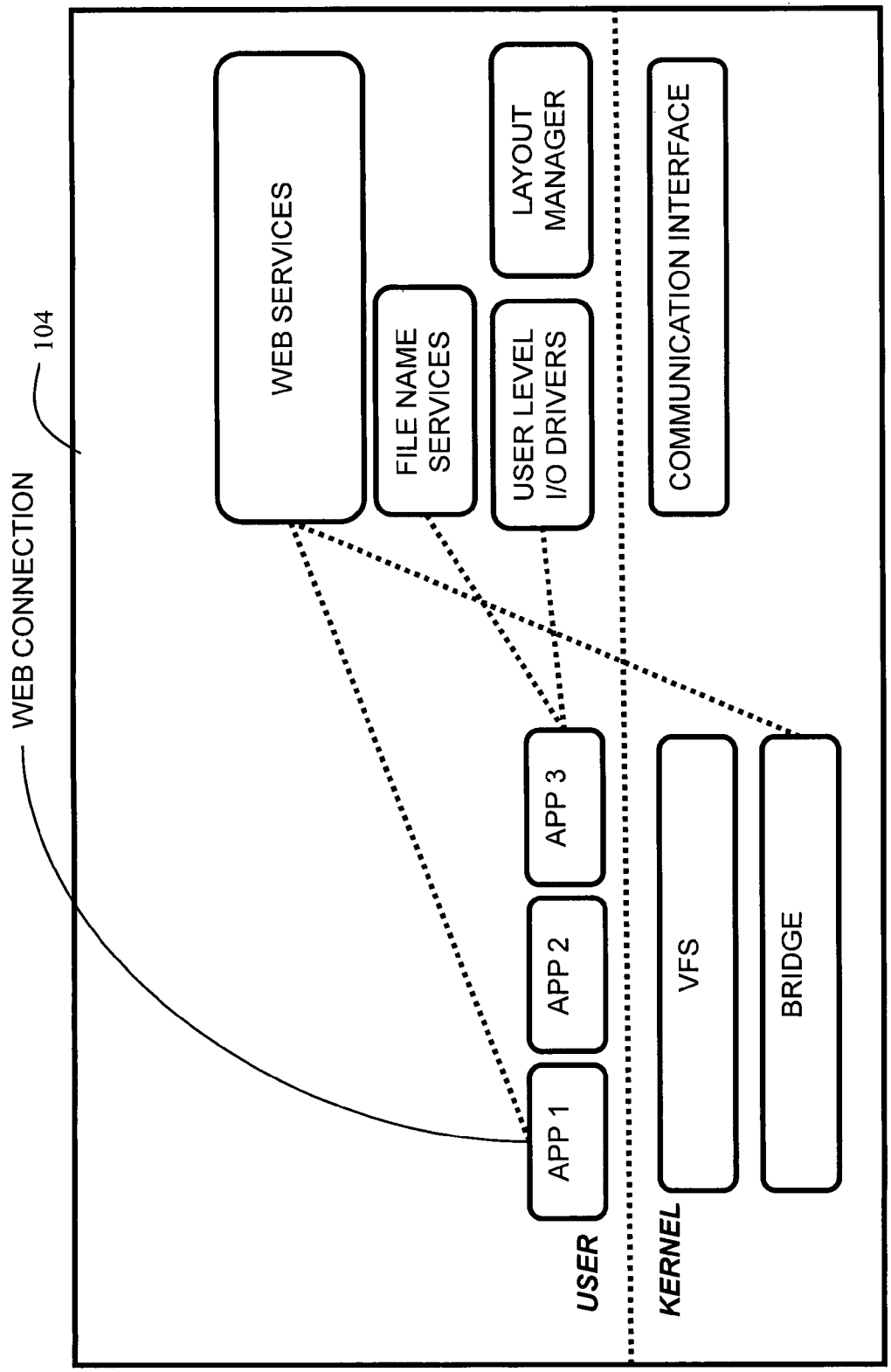
FIG. 25 is a diagram illustrating a client having a plurality of applications, a Web Services layer, file name services, user level I/O drivers, and a layout manager in user memory address space and having a VFS, a communication interface and a kernel memory address space to user memory address space bridge in kernel memory address space according to an embodiment of the system described herein.

Referring to FIG. 25, the client 104 is shown as having a plurality of applications in user memory address space, each of which may use a different interface to access file objects of the servers 102. Each of the applications shown in FIG. 25 is meant to represent one or more applications. Accordingly, APP1 may present one or more applications that access file objects at the servers 102 using a Web Services interface. The APP1 application may include a Web connection that allows communication with the client 104, which acts as a Web server to other computing devices (not shown) that access the client 104 through the Web connection. APP2 may represent one or more applications that access file objects at the servers 102 using the VFS, and APP3 may represent one or more applications that directly operate on file objects at the servers 102. The different interfaces may operate at the client 104 at the same time.

Note that may other combinations of configurations, including illustrated configurations, are possible so that the client 104 may simultaneously present to applications thereon different interfaces. For example, it is possible to combine the configurations illustrated in FIGS. 15, 19, and 22 and/or combine the configurations of FIGS. 17, 20, and 23. Other combinations, including combinations of only two illustrated configurations, are also possible. The servers 102 provide the file objects to the clients 104 provided: 1) the requesting client has appropriate authorization for whatever operation is requested for the file objects; and 2) there is no conflict with any previous request. For example, in systems where only one client is allowed to write to an object at any one time, the servers 102 would not allow one of the clients 104-106 to modify a particular object while another one of the clients 104-106 is also modifying the object.

The system described herein may be used with any server, or any group of servers, capable of providing file objects to clients. The particular form of the file objects may vary without departing from the spirit and scope of the invention. In some instances, the order of steps in the flow charts may be modified, where appropriate. The system described herein may be implemented using a computer program product/software provided in a computer-readable storage medium.

While the invention has been disclosed in connection with various embodiments, modifications thereon will be readily apparent to those skilled in the art. Accordingly, the spirit and scope of the invention is set forth in the following claims.

What is claimed is:

1. A method of accessing data file objects, comprising:
providing a file system interface on at least one client, wherein the file system interface allows an application running on the at least one client to make file system calls to access the data file objects and wherein providing the file system interface includes providing a virtual file system in a kernel address space of the at least one client;
providing a Web Services interface on the at least one client, wherein the Web interface allows an application to access file objects using the Web while file objects are being accessed through the file system interface; and
providing a layout manager that manages file objects, wherein the layout manager is provided in user address space of the at least one client and wherein the virtual file system accesses the layout manager using a bridge between kernel memory address space and user memory address space.

2. A method, according to claim 1, wherein the Web Services interface includes at least one of: a SOAP interface and a REST interface.

3. A method, according to claim 1, further comprising:
providing a direct file object interface on the at least one client, wherein the direct file object interface allows an application to directly access file objects at the same time that file objects are being accessed using the Web Services interface and using the file system interface.

4. A method, according to claim 1, further comprising:
providing file name services that translate file names into file object identifiers, wherein the file name services are accessed by at least one of: the file system interface and the Web Services interface.

5. A client that accesses a plurality of file objects, comprising:
a file system interface that allows an application running on the at least one client to make file system calls to access the data file objects, wherein the file system interface includes a virtual file system in a kernel address space of the at least one client;
a Web Services interface that allows an application to access file objects using the Web while file objects are being accessed through the file system interface;
a communication interface, coupled to the file system interface and to the Web Services interface, that exchanges file object data between the client and a plurality of servers containing the file objects; and
a layout manager that manages file objects, wherein the layout manager is provided in the kernel address space of the at least one client and wherein the virtual file system accesses the layout manager using a bridge between kernel memory address space and user memory address space.

6. A client, according to claim 5, further comprising:
a direct file object interface that allows an application to directly access file objects at the same time that file objects are being accessed using the Web Services interface and using the file system interface.

7. A client, according to claim 5, further comprising:
a file name service that translates file names into file object identifiers, wherein the file name service is accessed by at least one of: the file system interface and the Web Services interface.

8. Computer software, provided in a computer-readable storage medium, the software comprising:
executable code that allows an application running on at least one client to make file system calls to access the data file objects using a file system interface, wherein the file system interface includes a virtual file system in a kernel address space of the at least one client;
executable code that allows an application to access file objects using the Web while file objects are being accessed through the file system interface; and
executable code, provided in the kernel address space of the at least one client, that manages file objects and is accessed using a bridge between kernel memory address space and user memory address space.

9. Computer software, according to claim 8, further comprising:
executable code that allows an application to directly access file objects at the same time that file objects are being accessed using the Web and using file system calls.

10. Computer software, according to claim 8, further comprising:
executable code that translates file names into file object identifiers.

11. A system that simultaneously allows accessing a plurality of file objects using a file system interface and a Web Services interface, the system comprising:
a plurality of servers that contain the file objects; and
at least one client, coupled to the servers, the client including a the file system interface that allows an application running on the at least one client to make file system calls to access the data file objects, wherein the file system interface includes a virtual file system in a kernel address space of the at least one client, a Web Services interface that allows an application to access file objects using the Web while file objects are being accessed through the file system interface, a communication interface, coupled to the file system interface and the Web Services interface, that exchanges file object data between the client and a plurality of servers containing the file objects, and a layout manager that manages file objects, wherein the layout manager is provided in the kernel address space of the at least one client and wherein the virtual file system accesses the layout manager using a bridge between kernel memory address space and user memory address space.

* * * * *